US012688520B2

(12) United States Patent (10) Patent No.: US 12,688,520 B2
Zhu et al. (45) Date of Patent: Jul. 21, 2026

(54) INTERACTION METHOD FOR ESTABLISHING ASSOCIATION RELATIONSHIP, AND ELECTRONIC DEVICE FOR ESTABLISHING ASSOCIATION RELATIONSHIP

(71) Applicant: Douyin Vision Co., Ltd., Beijing (CN)

(72) Inventors: Yunfei Zhu, Beijing (CN); Wenjing Liu, Beijing (CN); Xiongjiu Li, Beijing (CN); Boyang Jiang, Beijing (CN); Fu Wen, Beijing (CN); Sen Liu, Beijing (CN)

(73) Assignee: Douyin Vision Co., Ltd., Beijing (CN)

( * ) Notice: Subject to any disclaimer, the term of this patent is extended or adjusted under 35 U.S.C. 154(b) by 65 days.

(21) Appl. No.: 18/463,180

(22) Filed: Sep. 7, 2023

(65) Prior Publication Data

US 2024/0077992 A1 Mar. 7, 2024

(30) Foreign Application Priority Data

Sep. 7, 2022 (CN) .......................... 202211091923.3

(51) Int. Cl.
| | |
|---|---|
| *G06F 3/0484* | (2022.01) |
| *G06F 3/0482* | (2013.01) |
| *G06Q 10/40* | (2026.01) |

(52) U.S. Cl.
CPC .......... *G06F 3/0484* (2013.01); *G06F 3/0482* (2013.01); *G06Q 10/40* (2026.01)

(58) Field of Classification Search
CPC ..... G06F 3/0484; G06F 3/0482; G06Q 10/10; G06Q 30/0217; G06Q 30/0226;
(Continued)

(56) References Cited

U.S. PATENT DOCUMENTS 10,580,028 B1 * 3/2020 Williams ........... G06Q 30/0215
2012/0226588 A1 * 9/2012 Wuhrer .................. G06Q 20/12
705/27.1
(Continued)

FOREIGN PATENT DOCUMENTS

| CN | 102025697 A | 4/2011 |
|---|---|---|
| CN | 107945035 A | 4/2018 |

(Continued)

OTHER PUBLICATIONS

China National Intellectual Property Administration, Office Action Issued in Application No. 202211091923.3, Apr. 11, 2025, 34 pages.
(Continued)

*Primary Examiner* — Nicholas Ulrich
(74) *Attorney, Agent, or Firm* — Alleman Hall LLP

(57) ABSTRACT

Provided are an interaction method and apparatus, an electronic device, a storage medium, and a program product. The method includes displaying a gift panel in response to a gift panel display operation for a target object, where the gift panel is configured for a gifting user to select a recipient user corresponding to the target object, the gifting user includes a target user, and the target object is configured to establish, for the recipient user, a first association relationship between the recipient user and the target user; and sending a target gift request to a server in response to a gift operation acting in the gift panel.

10 Claims, 10 Drawing Sheets

(58) Field of Classification Search
CPC ........ G06Q 30/06; G06Q 50/01; G06Q 10/40;
H04N 21/4788
See application file for complete search history.

(56) References Cited

U.S. PATENT DOCUMENTS

| | | | | |
|---|---|---|---|---|
| 2013/0212610 A1* | 8/2013 | Hussain | ............. | H04N 21/4784 |
| | | | | 725/23 |
| 2015/0310567 A1* | 10/2015 | Wu | ........................ | G06Q 20/10 |
| | | | | 705/26.5 |
| 2018/0025330 A1* | 1/2018 | Lee | ........................ | G06Q 20/22 |
| | | | | 726/26 |
| 2022/0070504 A1 | 3/2022 | Hartnett et al. | | |
| 2023/0209145 A1* | 6/2023 | Tashiro | ............. | H04N 21/2543 |
| | | | | 725/23 |
| 2025/0016401 A1* | 1/2025 | Xu | ....................... | H04N 21/435 |

FOREIGN PATENT DOCUMENTS

| | | | |
|---|---|---|---|
| CN | 110827073 A | 2/2020 | |
| CN | 110995568 A | 4/2020 | |
| CN | 112672176 A | 4/2021 | |
| CN | 112954460 A | 6/2021 | |
| CN | 113296669 A | 8/2021 | |
| CN | 113596508 A | 11/2021 | |
| CN | 113850574 A | 12/2021 | |
| CN | 114356484 A | 4/2022 | |
| CN | 114915828 A | 8/2022 | |
| CN | 115695926 A | 2/2023 | |
| KR | 20220039445 A | 3/2022 | |
| WO | 2021259301 A1 | 12/2021 | |
| WO | 2022116864 A1 | 6/2022 | |

OTHER PUBLICATIONS

China National Intellectual Property Administration, Search Report Issued in Application No. 202211091923.3, Apr. 10, 2025, 8 pages.
ISA China National Intellectual Property Administration, International Search Report and Written Opinion Issued in Application No. PCT/CN2023/117471, Nov. 10, 2023, WIPO, 20 pages.
China National Intellectual Property Administration, First Office Action for Chinese Application No. 202211091923.3, mailed on Oct. 28, 2024, 31 pages.
European Patent Office, Extended European Search Report Issued in Application No. 23862473.8, Mar. 6, 2026, Germany, 16 pages.

* cited by examiner 410 420

510 520

610 620

INTERACTION METHOD FOR ESTABLISHING ASSOCIATION RELATIONSHIP, AND ELECTRONIC DEVICE FOR ESTABLISHING ASSOCIATION RELATIONSHIP

CROSS-REFERENCE TO RELATED APPLICATION

This application claims priority to Chinese Patent Application No. 202211091923.3 filed Sep. 7, 2022, the disclosure of which is incorporated herein by reference in its entirety.

TECHNICAL FIELD

Embodiments of the present disclosure relate to the field of computer technology and, in particular, to an interaction method, and an electronic device.

BACKGROUND

Currently, some video applications have launched video live streaming scenarios in which a subscription function can be selected as required. The subscription function means that a user "subscribes" to a corresponding anchor through certain virtual resources and can synchronously obtain specific privileges (such as medals and/or a permission to use stickers) in the live-stream room of the anchor.

However, the subscription manner of existing applications is relatively simple, and the interactivity is poor.

SUMMARY

Embodiments of the present disclosure provide an interaction method and apparatus, an electronic device, a storage medium, and a program product to enrich the subscription manner of anchors, thereby improving interactivity.

An embodiment of the present disclosure provides an interactive method. The interactive method includes that: a gift panel is displayed in response to a gift panel display operation for a target object, where the gift panel is configured for a gifting user to select a recipient user corresponding to the target object, the gifting user includes a target user, and the target object is configured to establish, for the recipient user, a first association relationship between the recipient user and the target user; and a target gift request is sent to a server in response to a gift operation acting in the gift panel, where the target gift request is used for requesting the server to send the target object to the recipient user.

An embodiment of the present disclosure further provides an interactive method. The interactive method includes that a target gift request of a target object is received, where the target gift request is sent by a gift client, a gifting user corresponding to the gift client includes a target user, and the target object is configured to establish, for a recipient user for which the target gift request requests gifting, a preset association relationship between the recipient user and the target user; and in response to the target gift request, the target object is sent to the recipient user and gift prompt information is sent to a recipient client of the recipient user.

An embodiment of the present disclosure further provides an interactive method. The interactive method includes that: gift prompt information is displayed, where the gift prompt information is sent by a server after the server sends a target object requested to be gifted by a gifting user to a recipient user, the gifting user includes a target user, and the target object is configured to establish, for the recipient user, a preset association relationship between the recipient user and the target user; and introduction information of the preset association relationship is displayed in response to a trigger operation for the gift prompt information.

An embodiment of the present disclosure further provides an electronic device. The electronic device includes one or more processors and a memory.

The memory is configured to store one or more programs.

When the one or more programs, executed by the one or more processors, cause the one or more processors to implement the interaction method described in the embodiments of the disclosure.

Embodiments of the disclosure provide an interaction method and apparatus, an electronic device, a storage medium, and a program product. The method includes that a gift panel is displayed in response to a gift panel display operation for a target object, where the gift panel is configured for a gifting user to select a recipient user corresponding to the target object, the gifting user includes a target user, and the target object is configured to establish, for the recipient user, a first association relationship between the recipient user and the target user; and a target gift request is sent to a server in response to a gift operation acting in the gift panel, where the target gift request is used for requesting the server to send the target object to the recipient user. According to the technical scheme, the target gift request is sent to the server in response to the gift operation acting in the gift panel so as to implement gifting a target object configured to establish a first association relationship between the recipient user and the target user for the recipient user when the target user serves as a gifting user and enrich a subscription manner of the target user, thereby improving interactivity.

BRIEF DESCRIPTION OF DRAWINGS

The preceding and other features, advantages, and aspects of embodiments of the present disclosure become more apparent with reference to the embodiments hereinafter in conjunction with drawings. Same or similar reference numerals in the drawings denote same or similar elements. It is to be understood that the drawings are illustrative and that originals and elements are not necessarily drawn to scale.

3

4

Figure 12:
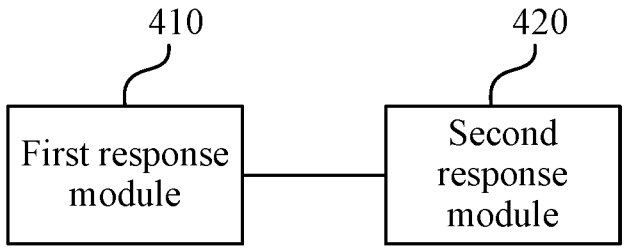

FIG. 12 is a diagram illustrating the structure of an interaction apparatus according to an embodiment of the present disclosure.

Figure 13:
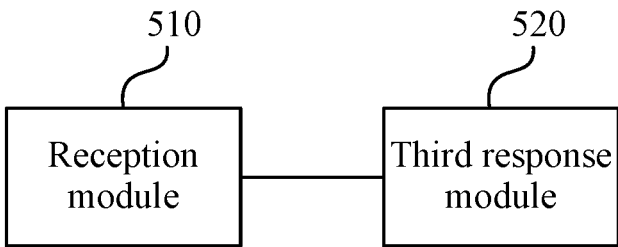

FIG. 13 is a diagram illustrating the structure of an interaction apparatus according to an embodiment of the present disclosure.

Figure 14:
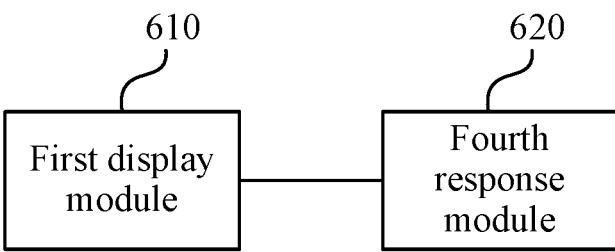

FIG. 14 is a diagram illustrating the structure of an interaction apparatus according to an embodiment of the present disclosure.

Figure 15:
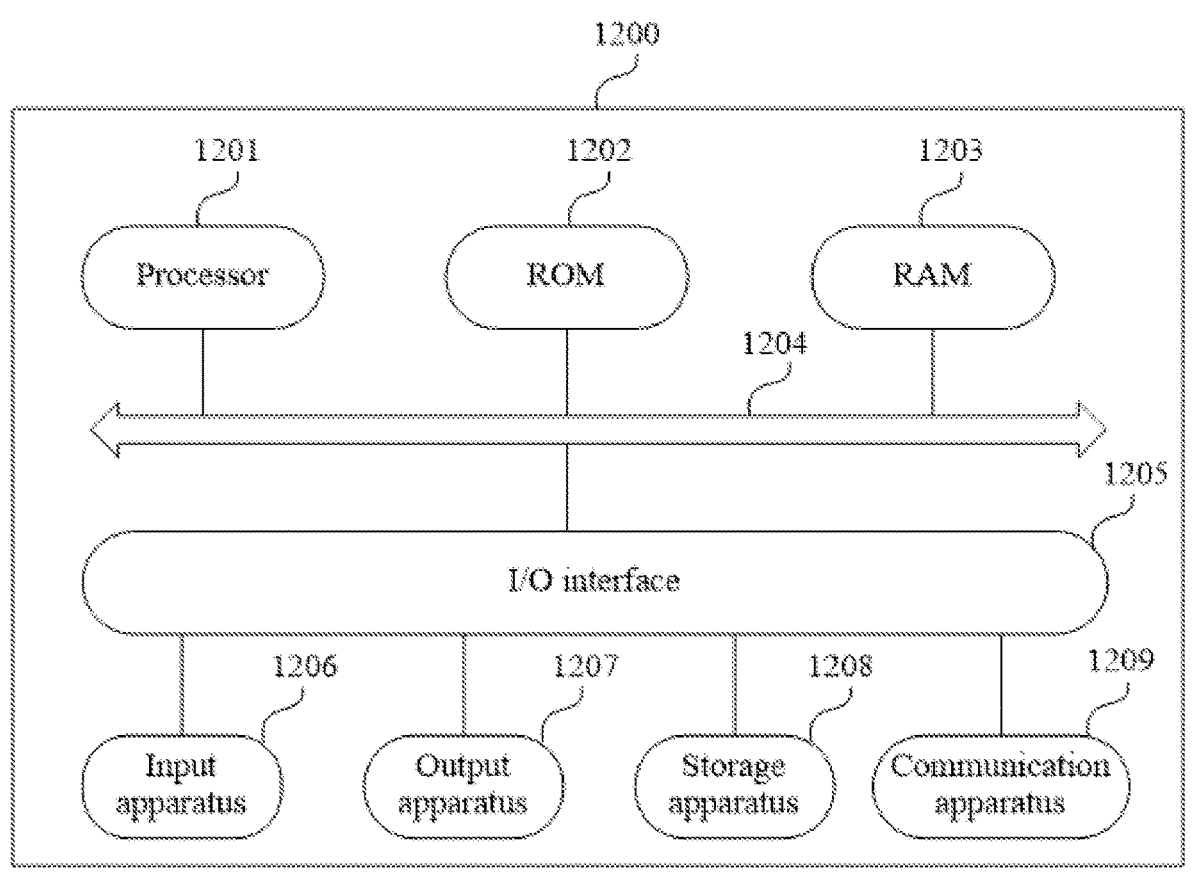

FIG. 15 is a diagram illustrating the structure of an electronic device according to an embodiment of the present disclosure.

DETAILED DESCRIPTION

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure is thoroughly and completely understood. It is to be understood that drawings and embodiments of the present disclosure are merely illustrative and are not intended to limit the scope of the present disclosure.

It is to be understood that various steps recited in the method embodiments of the present disclosure may be performed in a different order and/or in parallel. In addition, the method embodiments may include additional steps and/ or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least one another embodiment"; and the term "some embodiments" refers to "at least some embodiments". Related definitions of other terms are given in the description hereinafter.

It is to be noted that references to "first", "second", and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" in the present disclosure are intended to be illustrative and not limiting, and that those skilled in the art should understand that "one" or "a plurality" should be understood as "one or more" unless clearly expressed in the context.

The names of messages or information exchanged between multiple apparatuses in embodiments of the present disclosure are only for illustrative purposes and are not intended to limit the scope of such messages or information.

It is to be understood that prior to the use of the technical solution provided in the embodiments of the present disclosure, the type, scope of use, scenario of use, and the like of the personal information to which the present disclosure relates should be notified to users and authorized by the users in an appropriate manner in accordance with the relevant laws and regulations.

For example, in response to receiving an active request from a user, prompt information is sent to the user to explicitly prompt the user that the operation requested to execute needs to acquire and use personal information of the user. Thus, the user can freely choose, according to the prompt information, whether to provide personal information to software or hardware such as an electronic device, an application program, a server, or a storage medium that executes the operation of the technical solution in the present disclosure.

As an optional, but not limiting, embodiment, in response to receiving an active request from the user, the prompt information may be sent to the user in a manner such as a pop-up window in which the prompt information may be presented in the form of text. In addition, the pop-up window can also carry a selection control for the user to select "agree" or "disagree" to provide personal information to the electronic device.

It is to be understood that the preceding notification and acquiring user authorization process is merely illustrative and does not constitute a limitation on the embodiments of the present disclosure. Other manners meeting the relevant laws and regulations may be applied to the embodiments of the present disclosure.

Figure 1:
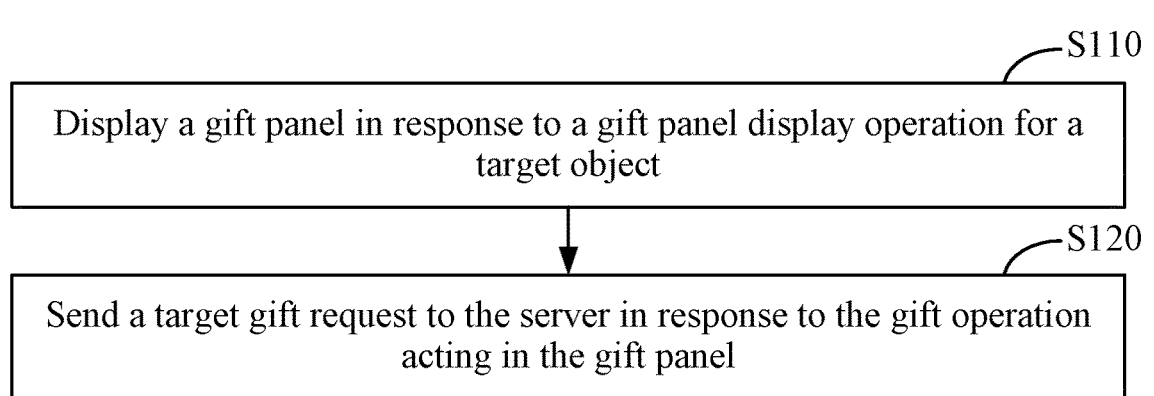
FIG. 1 is a flowchart of an interaction method according to an embodiment of the present disclosure.

FIG. 1 is a flowchart of an interaction method according to an embodiment of the present disclosure. The method is applicable to a case of gifting target objects. The method may be executed by an interaction apparatus. The apparatus may be implemented by software and/or hardware and is generally integrated on an electronic device. In this embodiment, the electronic device includes, but is not limited to, a computer, a laptop, a tablet computer, and/or a mobile phone.

As shown in FIG. 1, the interaction method provided in this embodiment of the present disclosure includes the following steps.

In S110, a gift panel is displayed in response to a gift panel display operation for a target object.

The gift panel is configured for a gifting user to select a recipient user corresponding to the target object. The gifting user includes a target user. The target object is configured to establish, for the recipient user, a first association relationship between the recipient user and the target user.

The target object may be considered as a virtual item and may be gifted between users. For example, the target object may be a subscription. The following takes the target object as a subscription as an example to describe. After a user subscribes to the target user, the user can establish a subscription relationship with the target user. Here, subscribing to the target user may be considered to be a member of the target user to enjoy the member rights provided by the target user in the validity period of the member. Accordingly, the subscription relationship may be considered as a member relationship. In addition, when the validity period of the member is exceeded, that is, when the member expires, the user can no longer enjoy the member rights provided by the target user. At this time, the user can become a member of the target user again by renewing the subscription to enjoy the member rights provided by the target user again.

In this embodiment, the gifting user may be considered as a user who gifts the target object to other users. The recipient user is a user who receives the target object gifted by the gifting user. The target user may be considered as a user corresponding to the target object and may be the same as or different from the gifting user. In an embodiment, the gifting user may include the target user. For example, the target user may be a user who performs live-stream in a video application program, that is, an anchor in a video application program. When the anchor receives the target object gifted by a server, the anchor may serve as a gifting user and gift the target object to the recipient user so that the recipient user establishes a first association relationship with the anchor. The target object may be configured to establish, for the recipient user, a first association relationship between the recipient user and the target user. The first association relationship may be understood as an association relation-ship between the recipient user and the target user, such as a subscription relationship. In this case, the recipient user has some permissions related to the target user, such as the recipient user having a medal and/or the permission to use some stickers in the live-stream room of the target user.

The gift panel display operation may refer to an operation configured to display the gift panel. The specific operation manner of the gift panel display operation is not limited. For example, the gift panel display operation may be an opera-tion of clicking a control in a page or an operation of performing a preset gesture in a page. The preset gesture may be a gesture which is preset. For example, the preset gesture may be a slide-up gesture.

The gift panel may be considered as a panel on which the gift selects the recipient user of the target object. It may be considered that multiple selectable users are displayed in the gift panel for the gifting user to select to determine the recipient user of the target object. In an embodiment, the gift panel may display user avatars of the multiple users in columns according to user types so that the gifting user determines the recipient user among different user types. The user types may include an association user and/or a recommended user, and the like. The association user may refer to a friend of the gifting user, such as a user who follows each other with the gifting user. The recommended user may be considered as a user whose recommendation degree is higher than a preset recommendation degree threshold in the live-stream room of the target user or a preset number of ranked first users whose recommendation degree are the highest in the live-stream room of the target user. The recommendation degree of a user may be deter-mined according to the interaction situation in the live-stream room of the target user, and the interaction situation may be the number of comments from the user.

In an embodiment, in this step, the gift panel may be displayed in response to the gift panel display operation for the target object. The gift panel display operation may be acted in different pages. This is not further expanded in this embodiment, as long as the gift panel can be displayed in response to the gift panel display operation for the target object.

In S120, a target gift request is sent to the server in response to the gift operation acting in the gift panel.

The target gift request used for requesting the server to send the target object to the recipient user.

It may be considered that the user may execute the gift operation in the gift panel. After the user executes the gift operation, the target gift request may be sent to the server in response to the gift operation acting in the gift panel. The gift operation may be considered as an operation of deter-mining to gift the target object to the recipient user. The specific content of the gift operation is not limited, such as an operation of clicking a control in the gift panel.

In an implementation, the gifting user may obtain a gift permission (that is, a gift subscription amount) of the target object through the task page of an application program. For example, when the gifting user completes execution of a task corresponding to the gift permission, the gift permission of the designated anchor and the designated number may be sent to the gifting user. The sending process may be different according to the state of the gifting user. For example, the sending can be completed when the gifting user enters the live-stream room of the designated anchor. In this case, if the gifting user does not enter the live-stream room of the designated anchor in a preset period (for example, 7 days) after completing the task, the gift permission may be directly sent to the gifting user. Alternatively, the gift permission may be sent when the user completes the corresponding task, and the gifting user is notified synchronously through an intra-station letter. Alternatively, when a trigger operation that the user gets the gift permission is received, the gift permission is sent.

When the gifting user has a gift subscription amount, the gifting user may be notified in the form of public screen information (for example, comment information) (for example, "You receive 5 gift permissions") in the live-stream room of the designated anchor. The gift panel is displayed after a gift control (that is, the gift panel display operation of the target object) is clicked.

In some embodiments, the gift panel includes a first identifier area and a second identifier area. The first identifier area is configured to display a user identifier of at least one association user of the gifting user. The association user has a second association relationship (such as mutual following) with the gifting user. The second identifier area is configured to display a user identifier of at least one recommended user in a target live-stream room. The recommended user may be recommended based on the online situation of viewers in the live-stream room. There may be repeated user identifiers in the first identifier area and the second identifier area (that is, there may be repeated users). For repeated user identifiers in the first identifier area and the second identifier area, when a user selects/unselects a user identifier in one identifier area, the user identifier displayed in another identifier area is also synchronously displayed as a selected state/an unselected state.

The first identifier area (that is, the friend column) and the second identifier area (that is, the online user column) support switching the displayed user identifiers by trans-verse sliding. The first identifier area and the second iden-tifier area can both default to display at most (instead of displaying one user identifier at a time) a preset number (for example, 15) of user identifiers. In the process in which the gifting user selects recipient users, the right side of the first identifier area and the right side of the second identifier area may display the number of the selected users (that is, the number of recipient users).

In addition, more user identifiers may be viewed by clicking "More" (that is, in response to a first list display operation acting in the gift panel), that is, a first user list is displayed. A search column in the first user list may support the gifting user to perform fuzzy matching. The search results may be arranged according to the ascending order of initials. The selected recipient users may still be displayed normally according to the search results during the search, and the selected state does not need to be removed. After the recipient users are selected, the gift panel may be returned. If the gifting user newly selects recipient users in "More", the right side of the corresponding identifier area may display the total number of the selected users (that is, the number of the selected users in the transverse sliding state+ the number of the newly selected users in "More").

In an embodiment, the "More" pop-up layer of friends and the "More" pop-up layer of online users may correspond to different candidate sets (where friends corresponds to a friend list and online users correspond to an online user list). That is, a first user list includes an association user list and/or a recommended user list. The association user list is con-figured to display a user identifier of an association user of the gifting user. The recommended user list is configured to display a user identifier of a recommended user in the target live-stream room.

An existing subscriber (that is, a recipient user) may be set to no longer be gifted. A subscription gift can be mutually exclusive with a designated recipient. That is, if a recipient has been gifted a subscription, the recipient cannot be gifted a subscription again. In addition, the recipient users displayed in the gift panel may not contain users who cannot be rewarded (that is, users in a blacklist) by default. The upper limit of the number of subscriptions that can be gifted subscriptions at one time may preferably be the subscription amount held by a user. A subscription is activated by default from the time when the subscription is sent to a recipient user. The validity period may be set as required.

When the gifting user successfully sends out a subscription, that is, the gift is successful, gift success prompt information may be displayed. The gift success prompt information prompts the gifting user that the gift is successful. Further, the gifting user may be encouraged through the gift prompt information to send message information to the recipient person (that is, the recipient user). The message information may be set to be visible only to the user himself and the recipient person.

If the current designated anchor does not start live streaming, the message and the gift prompt information are sent out when the designated anchor starts live streaming and the gifting user first enters the live-stream of the designated anchor (that is, after the gift prompt information is sent to the recipient client of the recipient user, when the recipient user is located in the target live-stream room of the target user, the message information sent by the gift client is sent to the recipient client of the recipient user in the form of comment information in the target live-stream room).

In an implementation, the gifting user may also be an anchor. That is, when the anchor has a subscription amount gifted by a task, in the live-stream room of the anchor, the anchor may be prompted by public screen information to gift the received subscriptions. The continuous period of the public screen information is set (for example, 20 s). The folding area of the public screen of the anchor side may display a prompt about that users in the live-stream room have used a gift subscription function, thereby encouraging the anchor to thank the users. The prompt frequency may be set times.

When the public screen information is clicked, a gift panel may be displayed on the anchor side. The first n users (n is the number of gifts owned by the anchor) in the live-stream room in the gift panel are selected as the recipient users by default. The recommended user column may be recommended based on online viewers in the live-stream room.

If the number of gifts remains, the public screen information continues being displayed at a preset frequency (for example, once every 15 minutes). After a subscription is sent, the recipient person may receive a prompt in the live-stream room and/or an intra-station letter. If the anchor still has gift permissions not sent out, the anchor may send the gift permissions through a live-stream page after the anchor ends the live streaming or before the anchor starts the live streaming. The prompt is sent out after the anchor starts the live streaming for a set period, and the target gift request may be sent to the server when the live streaming reaches the set period subsequently.

This embodiment of the disclosure provides an interaction method. The method includes that: a gift panel is displayed in response to a gift panel display operation for a target object, where the gift panel is configured for a gifting user to select a recipient user corresponding to the target object, the gifting user includes a target user, and the target object is configured to establish, for the recipient user, a first association relationship between the recipient user and the target user; and a target gift request is sent to a server in response to a gift operation acting in the gift panel, where the target gift request is used for requesting the server to send the target object to the recipient user. According to the method, the target gift request is sent to the server in response to the gift operation acting in the gift panel, implementing gifting a target object which is configured to establish, for the recipient user, a first association relationship between the recipient user and the target user when the target user serves as a gifting user and enriching a subscription manner of the target user, thereby improving interactivity.

In an embodiment, the method further includes that: permission prompt information for the target object is displayed in a preset page. The preset page includes a live-stream page of the target user and/or a message list page of the target user. The permission prompt information is sent by the server after the server grants a gift permission of the target object to the gifting user. The permission prompt information is used for prompting the gifting user to have the gift permission of the target object.

The step in which the gift panel is displayed in response to the gift panel display operation for the target object includes that the gift panel is displayed in response to a trigger operation for the permission prompt information.

The permission prompt information may be considered as information prompting the gifting user that the gifting user has a permission to gift the target object. The preset page may be considered as a preset screen for displaying the permission prompt information. The preset page may include a live-stream page of the target user and/or a message list page of the target user. The live-stream page may refer to a page where the target user performs the live streaming. The message list page may be configured to display related messages of the gifting user, such as notification messages. It may be considered that the permission prompt information is sent by the server after the server can grant the gift permission of the target object to the gifting user. The permission prompt information may be used for prompting the gifting user that the gifting user has the gift permission of the target object. The specific display patterns of the permission prompt information may be different according to different preset pages, and this is not limited in this embodiment.

In an embodiment, the permission prompt information for the target object may be displayed in the preset page, and a user may execute a trigger operation for the permission prompt information, for example, single-clicking or double-clicking the permission prompt information. Thus, an application program may implement the display of the display gift panel in response to the trigger operation for the permission prompt information.

In an embodiment, the recipient user includes a user corresponding to a user identifier in a selected state in a gift panel. The step in which the gift panel is displayed includes that the gift panel is displayed, and each user identifier in the gift panel is displayed to be in an unselected state; or, the gift panel is displayed, and at least one user identifier in the gift panel is displayed to be in a selected state.

The recipient user may include a user corresponding to a user identifier in a selected state in the gift panel. The user identifier may include a user avatar or the like, and the user identifier may be used for identifying a corresponding user.

The state of the user identifier may include a selected state and an unselected state. For example, the selected state may be a shaded state, and the unselected state may be a non-shaded state (that is, a normal state). The selected state can also be that a preset symbol is added on the user identifier to distinguish the unselected state. For example, the preset symbol may be a check mark.

In an implementation, the gift panel may be displayed in response to the gift panel display operation for the target object. Each user identifier in the gift panel may be displayed in an unselected state so that the gifting user selects users corresponding to user identifiers to determine recipient users. The user identifiers in the gift panel may also be that the display state of at least one user identifier is a selected state, and the display state of other user identifiers is an unselected state. That is, at least one user identifier is displayed in a selected state by default when the gift panel is displayed. The number of user identifiers in the selected state by default and the specific corresponding users may be set by relevant personnel. For example, the first user identifier is displayed in a selected state by default or the user identifiers whose number is consistent with the number of target objects that can be gifted currently by the gifting user are displayed in a selected state by default. In this case, the gifting user may take the users corresponding to the user identifiers displayed in the selected state as the final recipient users or may re-select the recipient users to determine the final recipient users.

In an embodiment, the gift panel includes a first identifier area and a second identifier area. The first identifier area is configured to display a user identifier of at least one association user of the gifting user. The association user has a second association relationship with the gifting user. The second identifier area is configured to display a user identifier of at least one recommended user in a target live-stream room. The target live-stream room is a live-stream room of the target user.

The association user may refer to a user having a second association relationship with the recipient user. The specific content of the second association relationship is not limited. For example, the second association relationship may be mutual following. The target live-stream room may be considered as a live-stream room of the target user for multiple users to participate. recommended users may be considered as users with a high participation degree in the target live-stream room. The recommended users may be determined according to the interaction degree between users and the target user.

In this embodiment, the gift panel may include a first identifier area and a second identifier area. The first identifier area is configured to display a user identifier of at least one association user of the gifting user. The second identifier area is configured to display a user identifier of at least one recommended user in a target live-stream room. It may be considered that the first identifier area may display user identifiers of all association users or may display user identifiers of a preset number of association users. The specific display situation may be set according to the actual situation. The preset number may be determined by relevant personnel.

Figure 2:
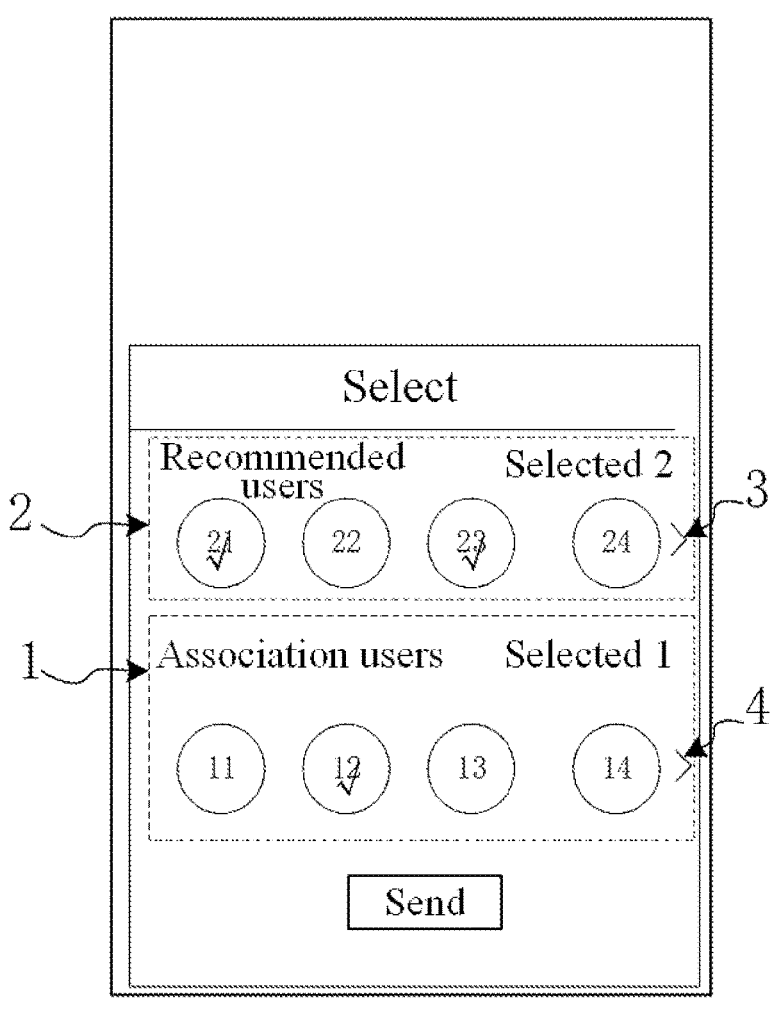
FIG. 2 is a diagram of a gift panel according to an embodiment of the present disclosure.

FIG. 2 is a diagram of a gift panel according to an embodiment of the present disclosure. As shown in FIG. 2, the gift panel includes a first identifier area 1 and a second identifier area 2. The first identifier area 1 is configured to display a user identifier (for example, users 11, 12, 13, and 14) of at least one association user of a gifting user. The second identifier area 2 is configured to display a user identifier (for example, users 21, 22, 23, and 24) of at least one recommended user in a target live-stream room.

In an embodiment, the recipient user includes a user corresponding to a user identifier in a selected state in a first user list, and the method further includes that the first user list is displayed in response to a first list display operation acting in the gift panel. The first user list includes an association user list and/or a recommended user list. The association user list is configured to display a user identifier of an association user of the gifting user. The recommended user list is configured to display a user identifier of a recommended user in the target live-stream room.

The first list display operation may be considered as an operation for displaying the first user list. For example, the first list display operation may be an operation of clicking a control in a page or an operation of performing a set gesture in a page. The set gesture may be a gesture which is preset. For example, the preset gesture may be a slide-left gesture. The first user list is configured to display user identifiers of all users of corresponding types. For example, the first user list may include an association user list and/or a recommended user list. The association user list is configured to display user identifiers of all association users of the gifting user. The recommended user list is configured to display user identifiers of all recommended users in the target live-stream room.

It may be considered that user identifiers of a preset number of association users may be displayed in the first identifier area, and when the number of association users is greater than the preset number, a user may view user identifiers of more association users by triggering the first list display operation, that is, displaying the first user list. In an embodiment, after a user triggers the first list display operation, an application program may receive the first list display operation and respond to it. The manner of receiving the first list display operation is not limited. For example, the first list display operation triggered on the surface of the electronic device may be received by a touch detection module disposed on the electronic device. Alternatively, an instruction for the first list display operation may be defined in the application program, and when the instruction is sent after the user performs the first list display operation, the instruction analysis may be performed by the electronic device and the corresponding first list display operation may be received.

Further, in this embodiment, different first user lists may be displayed according to different specific positions where the first list display operation is received. For example, when a specific position where the first list display operation is received is the first identifier area, an association user list may be displayed in response to the first list display operation acting in the first identifier area. When the first list display operation is received in the second identifier area, a recommended user list may be displayed in response to the first list display operation acting in the second identifier area.

User identifiers in a selected state in the gift panel are also in the selected state in the first user list.

Figure 3:
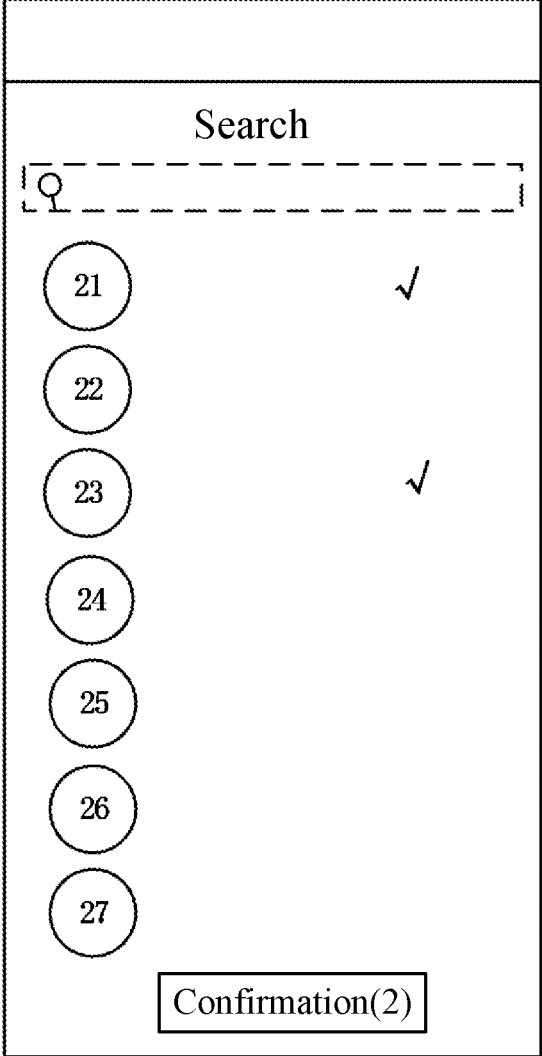
FIG. 3 is a diagram of a first user list according to an embodiment of the present disclosure.

FIG. 3 is a diagram of a first user list according to an embodiment of the present disclosure. After a first list display operation (for example, clicking a control 3 in FIG. 2) is triggered in a gift panel, the first user list (that is, FIG. 3) may be displayed in response to the first list display operation acting in the gift panel. As shown in FIG. 3, the first user list includes a recommended user list. In the recommended user list, user identifiers of multiple recommended users in the target live-stream room are displayed for a gifting user to select a recipient user.

In an embodiment, after the target gift request is sent to the server, the method further includes that a message panel is displayed in response to a message operation of the gifting user, where the message panel is configured for the gifting user to input message information; and in response to a message sending operation acting in the message panel, the message information is sent to the server to forward the message information to a recipient client of the recipient user through the server.

The message operation may be considered as an operation that the gifting user wants to leave a message. The specific content of the message operation is not further expanded, as long as the message panel can be triggered and displayed. The message panel may be configured for the gifting user to input message information. The message sending operation can be understood as an operation of triggering sending a message, such as an operation of clicking a control.

Exemplarily, after the target gift request is sent to the server, the gifting user may execute the message operation to display the message panel for the gifting user to input the message information. After the user inputs the message information, the message sending operation may be executed in the message panel. Thus, in response to the message sending operation acting in the message panel, the application program may send the message information to the server to forward the message information to the recipient client of the recipient user through the server.

In an embodiment, the method further includes that the message information is displayed in the form of comment information in the target live-stream page of the target user when the gifting user is located in the target live-stream room of the target user.

It may be considered that when the gifting user is located in the target live-stream room of the target user, the message information inputted in the message panel by the gifting user may be displayed in the form of comment information in the target live-stream page of the target user. The visible users of the message information are not limited. For example, the message information may be visible to all users in the target live-stream room or may be visible to merely the gifting user and the recipient user in the target live-stream room.

In an embodiment, the target object includes a second target object gifted by a target platform to the gifting user and/or a third target object gifted by a target user to the gifting user.

In this embodiment, the second target object may be considered as a target object gifted by a target platform to the gifting user. The target platform may refer to a service platform, such as a service party. Exemplarily, the gifting user may do certain tasks through the task page of the application program, and when the required tasks are reached, the target platform may gift the corresponding target object to the gifting user.

The third target object may be considered as a target object gifted by the target user to the gifting user. For example, when the target user is an anchor, a viewer in the live-stream room or a friend of the anchor in the live-stream room may gift a certain number of target objects to the target user. Thus, the target user may further regift the target objects. For example, the target user may further gift a target object that is gifted by another user to the target user to the recipient user in the live-stream room to establish, for the recipient user, a first association relationship between the recipient user and the target user.

Figure 4:
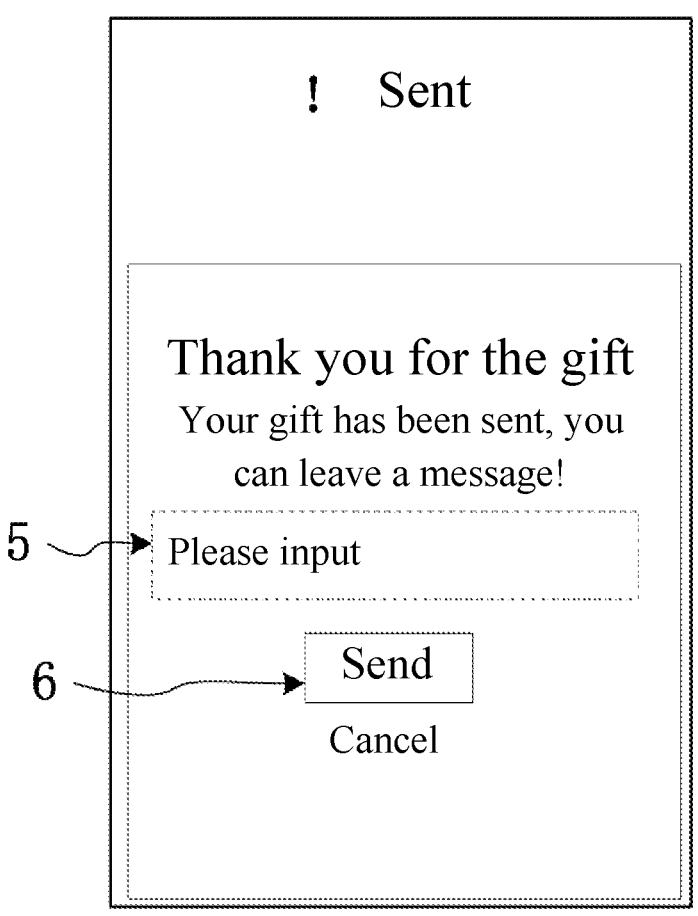
FIG. 4 is a diagram of a message panel according to an embodiment of the present disclosure.

FIG. 4 is a diagram of a message panel according to an embodiment of the present disclosure. As shown in FIG. 4, message information may be input in an input box 5, and after a control 6 (that is, a message sending operation acting in the message panel) is clicked, the message information is sent to a server to forward the message information to the recipient client of the recipient user through the server.

Figure 5:
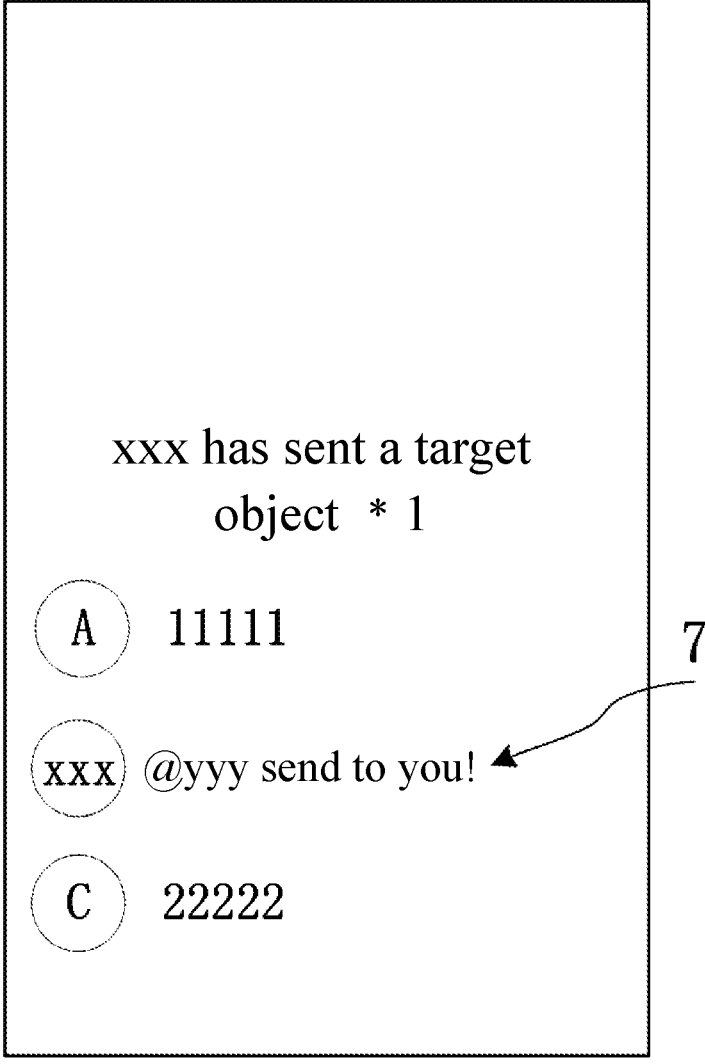
FIG. 5 is a diagram of a target live-stream page according to an embodiment of the present disclosure.

FIG. 5 is a diagram of a target live-stream page according to an embodiment of the present disclosure. As shown in FIG. 5, when a gifting user xxx is located in the target live-stream room of a target user, message information 7 (that is, @yyy send it to you!) may be displayed in the form of comment information in the target live-stream page of the target user. The message information 7 may be visible merely to the gifting user xxx and the recipient user yyy.

In an embodiment, the recipient user includes a user corresponding to a user identifier in a selected state in a second user list. The method further includes that a second user list is displayed in response to a second list display operation acting in the gift panel, where the second user list is configured to display a to-be-selected user identifier; and in response to a selection completion operation acting in the second user list, a user identifier in a selected state in the second user list is added to and displayed in the gift panel.

The second list display operation may be considered as an operation configured to display the second user list. For example, the second list display operation may be an operation of clicking a control in the gift panel. The second user list is configured to display identifiers of to-be-selected users. User identifiers of all to-be-selected users may be simultaneously displayed in the second user list. Alternatively, user identifiers may be displayed in different areas according to types of to-be-selected users.

In an embodiment, identifiers of to-be-selected users may not be displayed in the gift panel. After it is detected that a user triggers the second list display operation in the gift panel, the second list display operation may be received, and the second user list is displayed in response to the second list display operation acting in the gift panel. When user identifiers of all to-be-selected users are simultaneously displayed in the second user list, the selection of a recipient user may be performed in the second user list. When the recipient user is determined, the selection completion operation may be triggered. Then, user identifiers in a selected state in the second user list are added to and displayed in the gift panel in response to the selection completion operation acting in the second user list. When the user identifiers are displayed in different areas in the second user list according to types of the to-be-selected users, for example, the second user list may include a first identifier area and a second identifier area, where the first identifier area is configured to display a user identifier of at least one association user of the gifting user, and the second identifier area is configured to display a user identifier of at least one recommended user in a target live-stream room, the selection of the recipient user may be performed in the second user list; or by triggering a first list display operation at different areas, the first user list is displayed, the selection of a recipient user is performed in the first user list, and after the selection is completed, the second user list may be returned to determine the recipient user, that is, to trigger the selection completion operation, then, in response to the selection completion operation acting in the second user list, user identifiers in a selected state in the second user list are added to and displayed in the gift panel.

Figure 6:
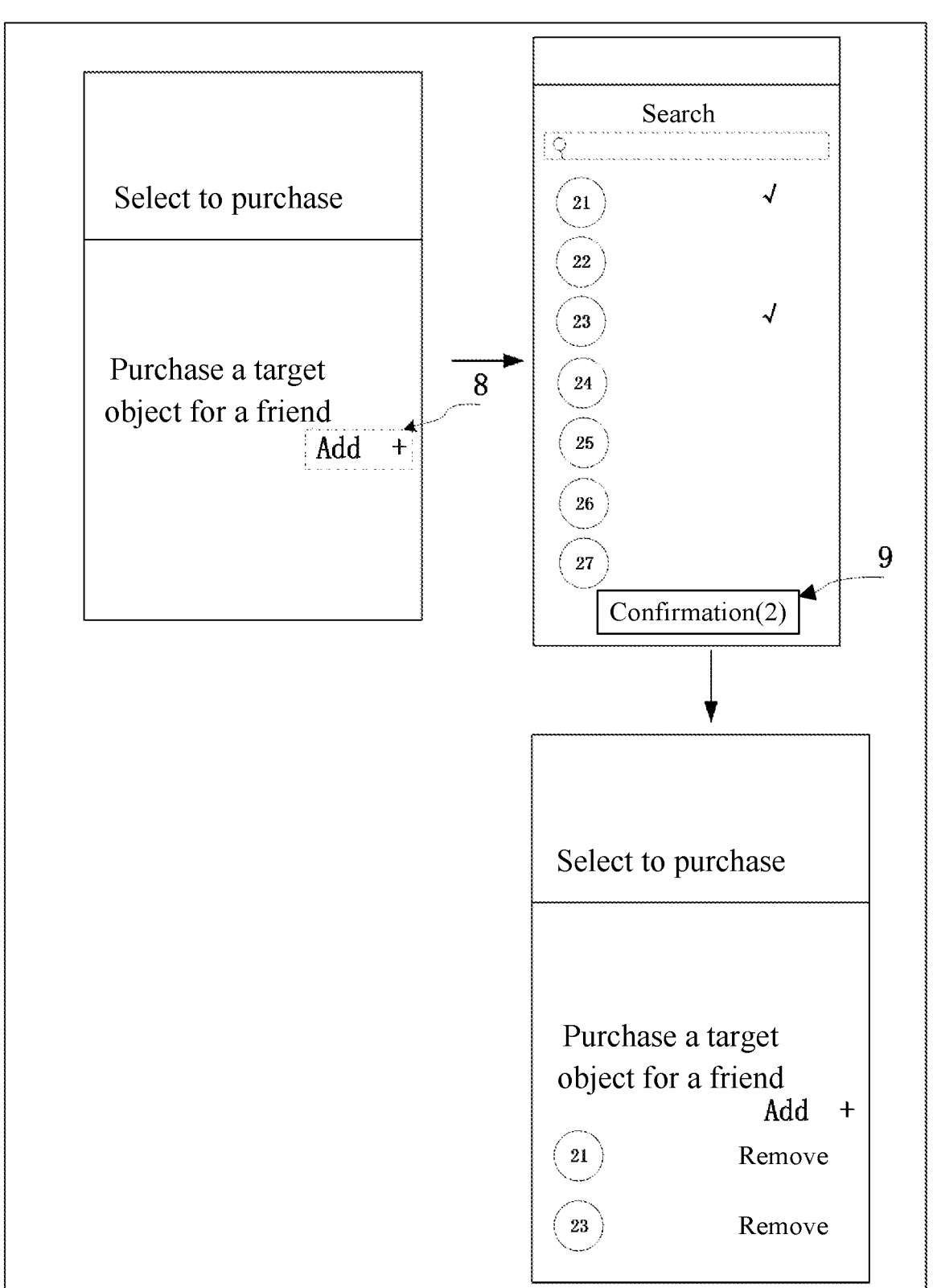
FIG. 6 is a diagram of another gift panel according to an embodiment of the present disclosure.

FIG. 6 is a diagram of another gift panel according to an embodiment of the present disclosure. As shown in FIG. 6, when a control 8 (that is, a second list display operation) in the gift panel is clicked, a second user list may be displayed in response to the second list display operation acting in the gift panel; the selection of a recipient user may be performed in the second user list; after the selection is completed, a control 9 (that is, a selection completion operation) may be triggered; and in response to the selection completion operation acting in the second user list, user identifiers (for example, user 21 and user 23) in a selected state in the second user list are added to and displayed in the gift panel.

Figure 7:
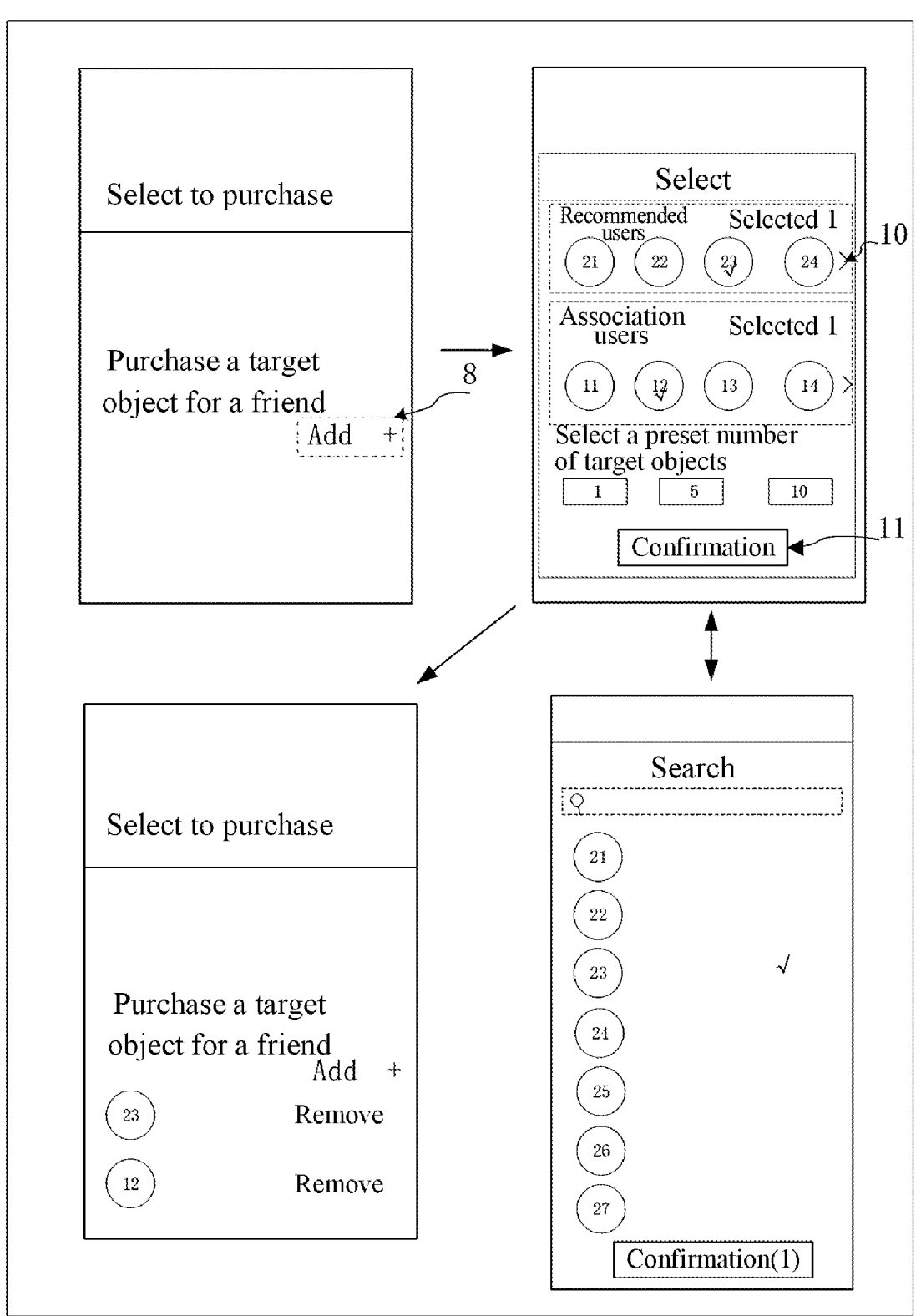
FIG. 7 is a diagram of another gift panel according to an embodiment of the present disclosure.

FIG. 7 is a diagram of another gift panel according to an embodiment of the present disclosure. As shown in FIG. 7, when a control 8 (that is, a second list display operation) in the gift panel is clicked, a second user list may be displayed in response to the second list display operation acting in the gift panel; the selection of a recipient user may be performed in the second user list, or a control 10 may be triggered to display a first user list to view and select user identifiers of more recipient users; after the selection is completed, the second user list may be returned; then, a trigger control 11 (that is, a selection completion operation) is clicked; and in response to the selection completion operation acting in the second user list, user identifiers (for example, user 23 and user 12) in a selected state in the second user list are added to and displayed in the gift panel.

In an embodiment, in response to an identifier selection operation, user identifiers corresponding to the identifier selection operation are switched from an unselected state to a selected state. Moreover/alternatively, in response to a deselection operation, user identifiers corresponding to the deselection operation are switched from a selected state to an unselected state.

The identifier selection operation may be considered as an operation of selecting user identifiers. The deselection operation may be considered as an operation of deselecting user identifiers.

In this step, the state of a user identifier may be adjusted according to an operation. For example, in response to the identifier selection operation, user identifiers corresponding to the identifier selection operation may be switched from an unselected state to a selected state. Moreover/alternatively, in response to the deselection operation, user identifiers corresponding to the deselection operation may be switched from a selected state to an unselected state.

In an embodiment, the gift panel display operation acts in a first panel corresponding to a target object. The target object includes a first target object acquired by the gifting user through resource transfer. The step in which the target gift request is sent to the server in response to the gift operation acting in the gift panel includes that a second panel is displayed in response to the gift operation acting in the gift panel, where the second panel is configured for the gifting user to perform a resource transfer operation; and the target gift request is sent to the server when the gifting user completes the resource transfer corresponding to the target object.

The first panel may be considered as a panel of acquiring target objects through resource transfer. Resources may be considered as virtual items. The second panel may be configured for a gifting user to perform a resource transfer operation. The resource transfer operation may be considered to be an operation that determines to acquire target objects through the resource transfer. For example, the resource transfer operation may include an operation of clicking a confirmation control and an operation of verifying user information. It is to be understood that in this embodiment, a corresponding target object may be obtained by exchanging a certain number of resources, such as purchasing the target object through resources, that is, obtaining the target object through resource transfer.

In this embodiment, the first panel may be displayed through executing the first panel display operation in different pages. For example, the first panel display operation may be executed in the page of the target live-stream room of the target user to display the first panel. For example, when the gifting user has not obtained a subscription function, the first panel may be displayed by clicking a control in the page of the target live-stream room. Moreover/alternatively, when the gifting user has obtained the subscription function, the first panel display operation may be triggered in a personal page of the gifting user to display the first panel. The personal page may be a page related to the information of the gifting user and may be configured to acquire a target object through resource transfer. The first panel display operation may also be executed in the task page of an application program to display the first panel. The task page may refer to a page in which the gifting user does tasks. For example, the gifting user may obtain a certain number of subscription functions through resource transfer to complete tasks.

It is to be understood that the gift panel may be displayed in response to the gift panel display operation in the first panel. In this case, the target object may include a first target object. The first target object may refer to a target object acquired by the gifting user through resource transfer. After the selection of a recipient user is completed in the gift panel, the gifting user may trigger a gift operation in the gift panel. The application program may display the second panel in response to the gift operation acting in the gift panel. When the gifting user completes the resource transfer corresponding to the target object, the gifting user may send a target gift request to the server to request the server to send the target object to the recipient user.

In an implementation, when the gifting user has not subscribed to an anchor or has subscribed to an anchor, the gift permission of a target object may be purchased through the first panel. That is, the target object includes the first target object obtained by the gifting user through the resource transfer, and the gift panel display operation is executed through triggering the control on the page (that is, the gift panel display operation acts in the first panel corresponding to the target object). Thus, in response to the second list display operation acting in the gift panel, the application program may display the second user list for the gifting user to select the recipient user in the second user list. Then, in response to the selection completion operation acting in the second user list, user identifiers in a selected state in the second user list are added to and displayed in the gift panel; and in response to the gift operation acting in the gift panel, the second panel is displayed. When the gifting user completes the resource transfer corresponding to the target object, the target gift request is sent to the server.

Figure 8:
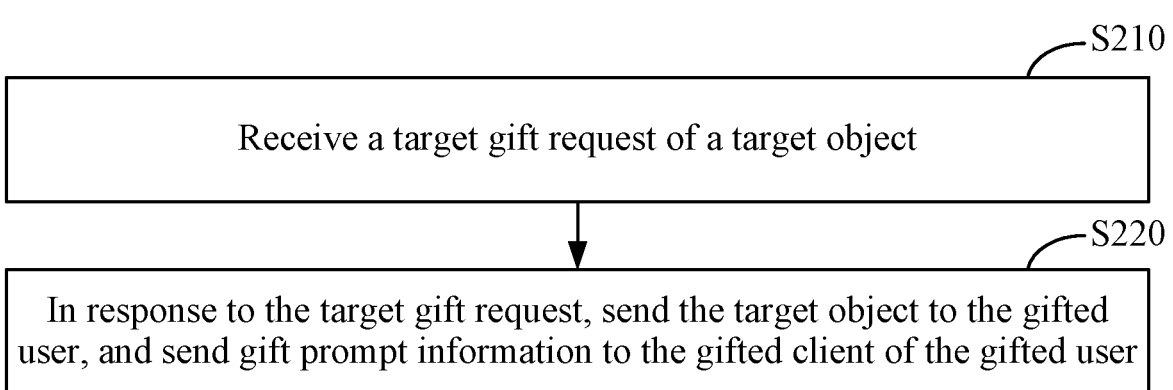
FIG. 8 is a flowchart of an interaction method according to an embodiment of the present disclosure.

FIG. 8 is a flowchart of an interaction method according to an embodiment of the present disclosure. The method is applicable to a case of gifting target objects. The method may be executed by an interaction apparatus. The apparatus may be implemented by software and/or hardware and is generally integrated on an electronic device. In this embodiment, the electronic device includes, but is not limited to, a computer, a laptop, a tablet computer, and/or a mobile phone.

As shown in FIG. 8, the interaction method provided in this embodiment of the present disclosure includes the following steps.

In S210, a target gift request of a target object is received.

The target gift request is sent by a gift client. The gifting user corresponding to the gift client includes a target user.

The target object is configured to establish, for a recipient user for which the target gift request requests gifting, a preset association relationship between the recipient user and the target user.

In this step, the target gift request may be a request sent by the gift client to the server and is used for sending the target object to the recipient user. The target object may be configured to establish, for the recipient user for which the target gift request requests gifting, a preset association relationship between the recipient user and the target user. The preset association relationship is an association relationship which is preset. For example, the preset association relationship may include a subscription relationship, such as, the recipient user has some permissions related to the target user. The gifting user corresponding to the gift client may include the target user or may include other users excluding the target user and the recipient user.

In this step, the server may receive the target gift request of the target object for subsequent operations.

In S220, in response to the target gift request, the target object is sent to the recipient user, and gift prompt information is sent to the recipient client of the recipient user.

The gift prompt information may refer to the information which prompts the recipient user of the recipient client to receive the target object.

After the target gift request of the target object is received, the target object may be sent to the recipient user in response to the target gift request. The gift prompt information is sent to the recipient client of the recipient user to prompt the recipient user.

According to the interaction method provided in this embodiment of the present disclosure, the target gift request of the target object is received, where the target gift request is sent by the gift client, the gifting user corresponding to the gift client includes the target user, and the target object is configured to establish, for the recipient user for which the target gift request requests gifting, the preset association relationship between the recipient user and the target user; and in response to the target gift request, the target object is sent to the recipient user and the gift prompt information is sent to the recipient client of the recipient user. According to the method, in response to the received target gift request, in the case where the gifting user corresponding to the gift client includes the target user, the target object configured to establish, for the recipient user, the preset association relationship between the recipient user and the target user can be gifted. This enriches a subscription manner of the target user, thereby improving interactivity.

In an embodiment, the step in which the target object is sent to the recipient user, includes that the preset association relationship between the recipient user and the target user is established for the recipient user for which the target gift request requests gifting.

In this step, the process of sending the target object to the recipient user may be understood as establishing a preset association relationship between the recipient user and the target user for the recipient user for which the target gift request requests gifting, such as giving the recipient user some permissions related to the target user. Exemplarily, the recipient user may have a medal and/or the permission to use some stickers in the target user live-stream room.

In an embodiment, before the target gift request of the target object is received, the method further includes that a gift permission of the target object is granted to the gifting user corresponding to the gift client, and permission prompt information is sent to the gift client.

The gift permission may be considered as the permission to gift a target object. For example, the gift permission may be the permission to gift the target object free of charge in a set time period or may be the permission to gift a preset number of target objects free of charge. This is not limited in this embodiment.

It may be considered that before the target gift request of the target object is received, the gift permission of the target object may be granted to the gifting user corresponding to the gift client, and the permission prompt information is sent to the gift client to prompt the gifting user of the gift client. The occasion of granting the gift permission of the target object to the gifting user may be set by relevant personnel. For example, the gift permission of the target object may be granted to the gifting user at a preset time. The preset time may be determined by an experience value. Alternatively, the gift permission of the target object may be granted to the gifting user when the gifting user meets a specific condition. The specific condition met by the gifting user may be, for example, that the gifting user completes a designated task. This is not limited in this embodiment.

In an embodiment, the gift permission includes a permission to gift a preset number of target objects. After the gift permission of the target object is granted to the gifting user corresponding to the gift client, the method further includes that resource transfer entries corresponding to the preset number of target objects are established.

A resource transfer entry may refer to an entry that obtains target objects through resource transfer. For example, the resource transfer entry may be an order of purchasing target objects. In an embodiment, when the gift permission includes the permission to gift a preset number of target objects, resource transfer entries corresponding to the preset number of target objects may be established after the gift permission of the target object is granted to the recipient user corresponding to the recipient client to perform subsequent steps. The number of resource transfer entries may be the same as the number of gifted target objects.

In an embodiment, after the target object is sent to the recipient user, the method further includes that the user identifier of the recipient user is added to entry information of a target resource transfer entry, where the target resource transfer entry is a resource transfer entry corresponding to the target gift request among the resource transfer entries, and the entry information includes the entry identifier of the resource transfer entry, the user identifier of the gifting user, and the user identifier of the target user; and the target resource transfer entry is processed, and the target resource transfer entry is marked as an end state after the processing is completed.

The target resource transfer entry may be a resource transfer entry corresponding to the target gift request among the resource transfer entries, that is, one resource transfer entry corresponds to one target gift request. The entry information may refer to information related to a resource transfer entry. For example, the entry information may include the entry identifier of the resource transfer entry, the user identifier of the gifting user, and the user identifier of the target user. The entry identifier is configured to identify the resource transfer entry. The user identifier is configured to represent the user. In an embodiment, after the target object is sent to the recipient user, the user identifier of the recipient user may be added to the entry information of the target resource transfer entry to perfect the entry information of the target resource transfer entry. Then, the target resource transfer entry may be processed. After the processing is completed, the state of the target resource transfer entry is marked as an end state to indicate that the resource transfer entry has been completed.

In an embodiment, the step in which the gift prompt information is sent to the recipient client of the recipient user includes that gift prompt information carrying message information sent by the gift client is sent to the recipient client of the recipient user. Alternatively, after the gift prompt information is sent to the recipient client of the recipient user, the method further includes that when the recipient user is located in the target live-stream room of the target user, message information sent by the gift client is sent to the recipient client of the recipient user in the form of comment information in the target live-stream room.

It may be considered that the process of sending the gift prompt information to the recipient client of the recipient user may be sending the message information together with the gift prompt information. That is, the gift prompt information carrying the message information sent by the gift client is sent to the recipient client of the recipient user. For example, the gift prompt information and the message information may be combined and sent in the form of a message to be displayed on a message list page. Alternatively, the gift prompt information and the message information may be sent separately. That is, after the gift prompt information is sent to the recipient client of the recipient user, the sending of the message information is determined according to the state of the recipient user. For example, when the recipient user is located in the target live-stream room of the target user, the message information sent by the gift client may be sent to the recipient client of the recipient user in the form of comment information in the target live-stream room. The visible users of the message information are not limited. For example, the message information may be visible to all users in the target live-stream room or may be visible to merely the gifting user and the recipient user in the target live-stream room.

An exemplary description on the interaction method provided in embodiments of the present disclosure is made hereinafter.

First, a gift amount may be sent through the upstream of an activity. That is, a gift permission of a target object is granted to a gifting user corresponding to a gift client. Then, a purchase phase is entered. That is, resource transfer entries corresponding to a preset number of target objects are established. Next, a target object is sent to a recipient user in response to a received target gift request. Then, the user identifier of the recipient user is added to the entry information of a target resource transfer entry. The target resource transfer entry is processed. The target resource transfer entry is marked as an end state after the processing is completed.

Figure 9:
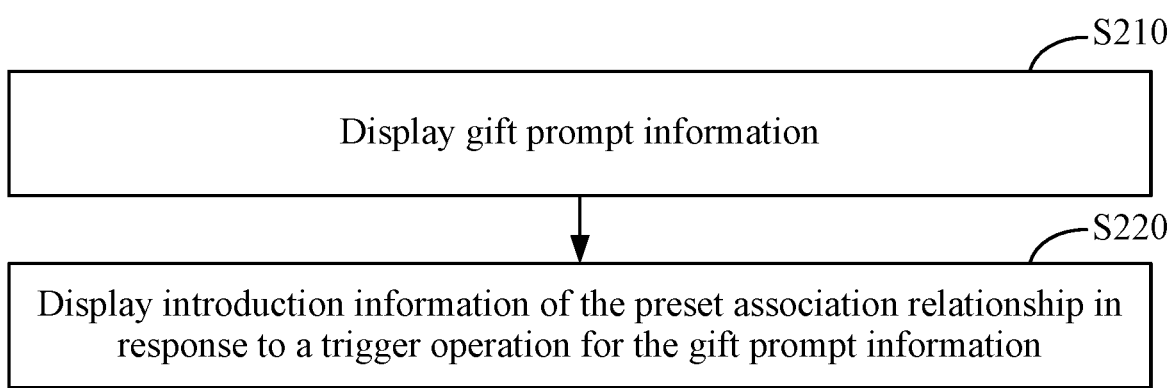
FIG. 9 is a flowchart of an interaction method according to an embodiment of the present disclosure.

FIG. 9 is a flowchart of an interaction method according to an embodiment of the present disclosure. The method is applicable to a case of gifting target objects. The method may be executed by an interaction apparatus. The apparatus may be implemented by software and/or hardware and is generally integrated on an electronic device. In this embodiment, the electronic device includes, but is not limited to, a computer, a laptop, a tablet computer, and/or a mobile phone.

As shown in FIG. 9, the interaction method provided in this embodiment of the present disclosure includes the following steps.

In S310, gift prompt information is displayed.

The gift prompt information is sent by a server after the server sends a target object requested to be gifted by a gifting user to a recipient user. The gifting user includes a target user. The target object is configured to establish, for the recipient user, a preset association relationship between the recipient user and the target user.

It may be considered that this embodiment may be executed by a recipient client. The recipient client may receive and display the gift prompt information sent by the server to prompt the recipient user corresponding to the recipient client to receive the target object gifted by the gifting user. The manner of displaying the gift prompt information is not limited. The gift prompt information may be displayed according to the actual situation. For example, the display of the gift prompt information is determined according to the current state of the recipient user when the recipient client receives the gift prompt information. Exemplarily, if the recipient user is located in the target live-stream room when the recipient client receives the gift prompt information, the gift prompt information may be displayed in the form of a pop-up window. A specific pattern of the pop-up window is not limited herein. If the recipient user is located in the live-stream room of another user when the recipient client receives the gift prompt information, the gift prompt information may be displayed in the form of a message in the current page. The display position and pattern may be set according to the actual situation of the page. If the recipient user is not located in the live-stream room when the recipient client receives the gift prompt information, the gift prompt information may be displayed in the form of a message in the message list page. In this embodiment, the gifting user may include the target user.

In S320, introduction information of the preset association relationship is displayed in response to a trigger operation for the gift prompt information.

The introduction information of the preset association relationship may be used for introducing the information of the preset association relationship, such as what permissions the recipient user has after the preset association relationship is established.

In this embodiment, when the gift prompt information is displayed, the introduction information of the preset association relationship may be displayed in response to the trigger operation acting on the gift prompt information. The display of the introduction information may be similar to the display of the gift prompt information, such as determined according to the current state of the recipient user.

Exemplarily, when the recipient user is located in the target live-stream room, the introduction information may be displayed in the live-stream page of the target live-stream room. For example, an introduction panel is displayed in the live-stream page of the target live-stream room. The introduction information is displayed in the introduction panel. When the recipient user is located in the live-stream room of another user, the recipient user may switch to the target live-stream room in response to the trigger operation for the gift prompt information, and the introduction information is displayed in the live-stream page of the target live-stream room. When the recipient user is not located in the live-stream room, the introduction information may be displayed in the message list page. For example, the introduction panel is displayed in the message list page, and the introduction information is displayed in the introduction panel.

According to the interaction method provided in this embodiment of the present disclosure, the gift prompt information is displayed, where the gift prompt information is sent by the server after the server sends the target object requested to be gifted by the gifting user to the recipient user, the gifting user includes the target user, and the target object is configured to establish, for the recipient user, the preset association relationship between the recipient user and the target user; the introduction information of the preset association relationship is displayed in response to the trigger operation for the gift prompt information. By receiving the target object which is sent by the server and configured to establish, for the recipient user, the preset association relationship between the recipient user and the target user, the method implements the complete gifting and receiving of the target object when the target user serves as the gifting user, thereby enriching the subscription mode of the target user and improving interactivity.

In an embodiment, the gift prompt information carries message information of the gifting user.

In the preceding implementations, when the gifting user has the message information, the message information of the gifting user may be carried in the gift prompt information to simultaneously display the message information and the gift prompt information.

In an embodiment, the gift prompt information does not carry message information of the gifting user, and the step in which the introduction information of the preset association relationship is displayed includes that the introduction information of the preset association relationship is displayed in the target live-stream page of the target user, and message information of the gifting user is displayed in the form of comment information in the target live-stream page, where the message information is sent by the server.

In the preceding implementations, when the gifting user has the message information and the gift prompt information does not carry the message information of the gifting user, the message information may be displayed separately from the gift prompt information. For example, the introduction information of the preset association relationship may be displayed in the target live-stream page of the target user, and the message information of the gifting user may be displayed in the form of comment information in the target live-stream page. The position and the form of the introduction information may be different from the position and the form of the message information. The specific display may be set according to the actual situation of the page. The visible users of the message information are not limited. For example, the message information may be visible to all users in the target live-stream room or may be visible to merely the gifting user and the recipient user in the target live-stream room.

In an embodiment, the method further includes that preset reply information for the message information is displayed in a preset input box of the target live-stream page; and in response to a reply information sending operation, the preset reply information is sent in the form of comment information in the target live-stream page.

The preset input box may be an input box that is preset and is configured to input preset reply information. The preset input box may be a comment input box in the target live-stream page. The comment input box may be an area for inputting comment information. Alternatively, the preset input box may be a newly added input box. For example, the preset input box is located above the comment input box and is configured to input preset reply information. The reply message sending operation may refer to an operation of sending a reply message, such as an operation of clicking a certain send control.

It may be considered that, after the message information of the gifting user is displayed, preset reply information for the message information may be displayed in the preset input box of the target live-stream page. After the reply information sending operation of the preset reply information is triggered, in response to the reply information sending operation, the preset reply information may be sent in the form of comment information in the target live-stream page. On this basis, through sending the preset reply information quickly, a quick reply to the message information of the gifting user is implemented.

Figure 10:
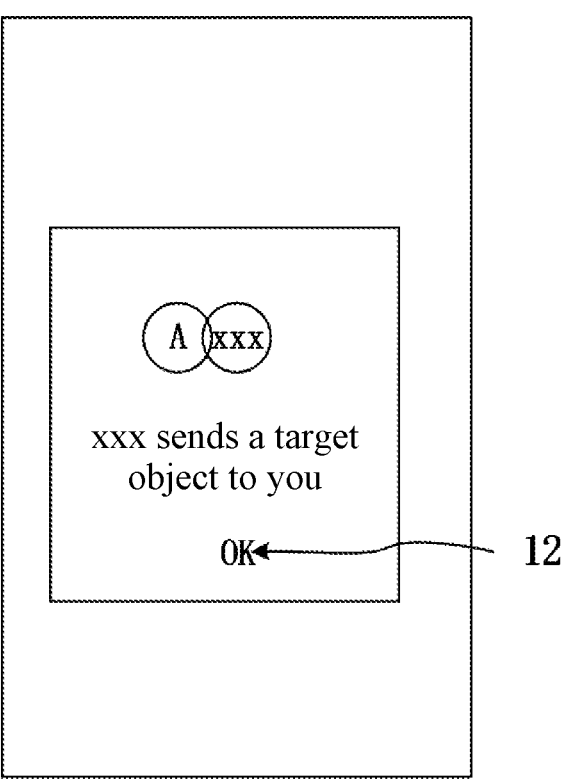
FIG. 10 is a diagram showing gift prompt information according to an embodiment of the present disclosure.

FIG. 10 is a diagram showing gift prompt information according to an embodiment of the present disclosure. As shown in FIG. 10, when a recipient user is located in a target live-stream page, the gift prompt information may be displayed in the form of a pop-up window. Then, a trigger operation (for example, a trigger control 12 in FIG. 10) for the gift prompt information may be triggered to display introduction information of a preset association relationship.

Figure 11:
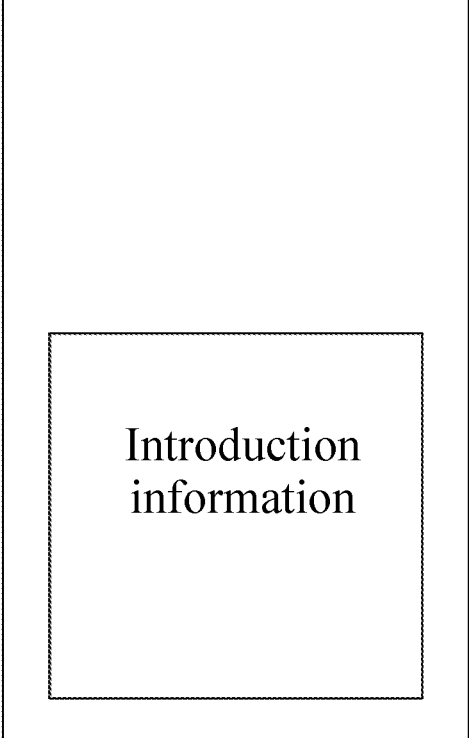
FIG. 11 is a diagram of introduction information according to an embodiment of the present disclosure.

FIG. 11 is a diagram of introduction information according to an embodiment of the present disclosure. As shown in FIG. 11, introduction information of a preset association relationship may be displayed in a target live-stream page of a target user, and message information (for example, the message information 7 in FIG. 5) of a gifting user may be displayed in the form of comment information in the target live-stream page.

In an implementation, after a recipient user receives a target object which is sent by a server and requested to be gifted by a gifting user, gift prompt information may be displayed and subsequent operation may be performed according to the state of the recipient user.

Exemplarily, when the recipient user is in a live-stream room of another anchor, the recipient user may be prompted by an advanced message that a subscription gifted by another person is received. Then, the recipient user clicks the advanced message to jump to the live-stream room of a designated anchor, and the gift prompt information is displayed in a target live-stream page. When the recipient user is in the live-stream room of the designated anchor, the recipient user may be prompted by a pop-up window to obtain a gift subscription. The pop-up window may be clicked to display the gift prompt information.

In addition, if the giver has a message, the message may be displayed on the public screen to prompt the recipient user to click to receive. If the donor has no message, a general receiving prompt may be displayed on the public screen. Exemplarily, the message may be that: giver A @ giver B: xxxx. The general receiving may be giver A @ giver B: Enjoy your 1 month subscription (that is, the introduction information of the preset association relationship is displayed in the target live-stream page of the target user, and the message information of the gifting user is displayed in the form of comment information in the target live-stream page).

In this embodiment, a quick comment of the recipient user merely visible to the gifting user may also be provided. That is, preset reply information for message information is displayed in the preset comment input box of the target live-stream page. The recipient user may directly click sending (that is, trigger a reply information sending operation) to reply to the gifting user. That is, the preset reply information is sent in the form of comment information in the target live-stream page.

Exemplarily, when the recipient user is located outside the live-stream room, the recipient user may be notified by an intra-station letter to receive a subscription gifted by another person. If the giver has a message, the content of the intra-station letter is the content of the message and guidance information (that is, the message information of the gifting user is carried in the gift prompt information).

It can be seen from the preceding description that in the face of the existing "subscription" function, this embodiment implements that a "subscription" capability can be gifted by a user. This includes that a platform gifts the "subscription" capability to a user and an anchor (that is, a gifting user). The gifting user can then gift the "subscription" capability to own friends and a recommended user in the live-stream room of the anchor. At the same time, the gifting user can purchase a certain amount of "subscription" capabilities and send the certain amount of "subscription" capabilities to an anchor, an own friend, or a recommended user in the live-stream room of an anchor.

In addition, in this embodiment, for a "gift" operation, when a "subscription" is given as a gift the split of the three following stages at the technical side is implemented: a recipient user being rewarded, a gifting user gifting the reward, and the reward being activated by the recipient user. That is, a user A (that is, the gifting user) obtains an amount of a subscription for gifting (that is, a gift permission with the target object) through a platform activity. The user A may freely send the subscription to a designated object B (that is, the recipient user). The designated object B automatically obtains the "subscription" identity of the platform and subscribes to the current anchor after accepting and activating the subscription sent by the user A.

FIG. 12 is a diagram illustrating the structure of an interaction apparatus according to an embodiment of the present disclosure. The apparatus is applicable to a case of gifting target objects. The apparatus may be implemented by software and/or hardware and is generally integrated on an electronic device.

As shown in FIG. 12, the apparatus includes a first response module 410 and a second response module 420.

The first response module 410 is configured to display a gift panel in response to a gift panel display operation for a target object. The gift panel is configured for a gifting user to select a recipient user corresponding to the target object. The gifting user includes a target user. The target object is configured to establish, for the recipient user, a first association relationship between the recipient user and the target user.

The second response module 420 is configured to send a target gift request to a server in response to a gift operation acting in the gift panel. The target gift request is used for requesting the server to send the target object to the recipient user.

According to the interaction apparatus provided in this embodiment of the disclosure, the first response module 410 is configured to display the gift panel in response to the gift panel display operation for the target object, where the gift panel is configured for the gifting user to select the recipient user corresponding to the target object, the gifting user includes the target user, and the target object is configured to establish, for the recipient user, the first association relationship between the recipient user and the target user. The second response module 420 is configured to send the target gift request to the server in response to the gift operation acting in the gift panel, where the target gift request is used for requesting the server to send the target object to the recipient user. According to the apparatus, the target gift request is sent to the server in response to the gift operation acting in the gift panel, which implements gifting a target object configured to establish, for the recipient user, a first association relationship between the recipient user and the target user when the target user serves as a gifting user and enriches a subscription manner of the target user, thereby improving interactivity.

In an embodiment, the interaction apparatus provided in this embodiment of the present disclosure further includes a second display module.

The second display module is configured to display permission prompt information for the target object in a preset page. The preset page includes a live-stream page of the target user and/or a message list page of the target user. The permission prompt information is sent by a server after the server grants a gift permission of the target object to the gifting user. The permission prompt information is used for prompting the gifting user to have the gift permission of the target object.

The first response module 410 is configured to display the gift panel in response to a trigger operation for the permission prompt information.

In an embodiment, the recipient user includes a user corresponding to a user identifier in a selected state in the gift panel. The first response module 410 is configured to display the gift panel, and display each user identifier that is in the gift panel to be in an unselected state; or, display the gift panel, and display at least one user identifier that is in the gift panel to be in a selected state.

In an embodiment, the gift panel includes a first identifier area and a second identifier area. The first identifier area is configured to display a user identifier of at least one association user of the gifting user. The association user has a second association relationship with the gifting user. The second identifier area is configured to display a user identifier of at least one recommended user in a target live-stream room. The target live-stream room is a live-stream room of the target user.

In an embodiment, the recipient user includes a user corresponding to a user identifier in a selected state in a first user list. The interaction apparatus provided in this embodiment of the present disclosure further includes a fifth response module.

The fifth response module is configured to display the first user list in response to a first list display operation acting in the gift panel. The first user list includes an association user list and/or a recommended user list. The association user list is configured to display a user identifier of an association user of the gifting user. The recommended user list is configured to display a user identifier of a recommended user in the target live-stream room.

In an embodiment, the recipient user includes a user corresponding to a user identifier in a selected state in a second user list. The interaction apparatus provided in this embodiment of the present disclosure further includes a sixth response module and a seventh response module.

The sixth response module is configured to display a second user list in response to a second list display operation acting in the gift panel. The second user list is configured to display a to-be-selected user identifier.

The seventh response module is configured to, in response to a selection completion operation acting in the second user list, add a user identifier in a selected state in the second user list to the gift panel and display the added user identifier in the gift panel.

In an embodiment, the gift panel display operation acts in a first panel corresponding to a target object. The target object includes a first target object acquired by the gifting user through resource transfer. The second response module 420 is configured to display a second panel in response to the gift operation acting in the gift panel, where the second panel is configured for the gifting user to perform a resource transfer operation; and send a target gift request to the server when the gifting user completes the resource transfer corresponding to the target object.

In an embodiment, the interaction apparatus provided in this embodiment of the present disclosure further includes an eighth response module and a ninth response module.

The eighth response module is configured to, after sending the target gift request to the server, display a message panel in response to a message operation of the gifting user. The message panel is configured for the gifting user to input message information.

The ninth response module is configured to, after sending the target gift request to the server, in response to a message sending operation acting in the message panel, send the message information to the server to forward the message information to a recipient client of the recipient user through the server.

In an embodiment, the interaction apparatus provided in this embodiment of the present disclosure further includes a third display module.

The third display module is configured to display the message information in the form of comment information in the target live-stream page of the target user when the gifting user is located in the target live-stream room of the target user.

In an embodiment, the target object includes a second target object gifted by a target platform to the gifting user and/or a third target object gifted by a target user to the gifting user.

The preceding interaction apparatus may execute the interaction method provided in the embodiments of the present disclosure and has functional modules and beneficial effects corresponding to the executed method.

FIG. 13 is a diagram illustrating the structure of an interaction apparatus according to an embodiment of the present disclosure. The apparatus is applicable to a case of gifting target objects. The apparatus may be implemented by software and/or hardware and is generally integrated on an electronic device.

As shown in FIG. 13, the apparatus includes a reception module 510 and a third response module 520.

The reception module 510 is configured to receive a target gift request of a target object. The target gift request is sent by a gift client. A gifting user corresponding to the gift client includes a target user. The target object is configured to establish, for a recipient user for which the target gift request requests gifting, a preset association relationship between the recipient user and the target user.

The third response module 520 is configured to, in response to the target gift request, send the target object to the recipient user and send gift prompt information to a recipient client of the recipient user.

According to the interaction apparatus provided in this embodiment of the present disclosure, the reception module 510 receives the target gift request of the target object, where the target gift request is sent by the gift client, the gifting user corresponding to the gift client includes the target user, and the target object is configured to establish, for the recipient user for which the target gift request requests gifting, the preset association relationship between the recipient user and the target user; in response to the target gift request, the third response module 520 sends the target object to the recipient user and sends gift prompt information to the recipient client of the recipient user. According to the apparatus, in response to the received target gift request, in the case where the gifting user corresponding to the gift client includes the target user, the target object configured to establish, for the recipient user, the preset association relationship between the recipient user and the target user can be gifted. This enriches a subscription manner of the target user, thereby improving interactivity.

In an embodiment, the third response module 520 is configured to establish, for the recipient user for which the target gift request requests gifting, the preset association relationship between the recipient user and the target user.

In an embodiment, the interaction apparatus provided in this embodiment of the present disclosure further includes a permission granting module.

The permission granting module is configured to, before the target gift request of the target object is received, grant a gift permission of the target object to the gifting user corresponding to the gift client and send permission prompt information to the gift client.

In an embodiment, the gift permission includes a permission to gift a preset number of target objects. The interaction apparatus provided in this embodiment of the present disclosure further includes an order establishment module.

The order establishment module is configured to, after granting the gift permission of the target object to the gifting user corresponding to the gift client, establish resource transfer entries corresponding to the preset number of target objects.

In an embodiment, the interaction apparatus provided in this embodiment of the present disclosure further includes an adding module and a processing module.

The adding module is configured to, after the target object is sent to the recipient user, add the user identifier of the recipient user to entry information of a target resource transfer entry. The target resource transfer entry is a resource transfer entry corresponding to the target gift request among the resource transfer entries. The entry information includes the entry identifier of the resource transfer entry, the user identifier of the gifting user, and the user identifier of the target user.

The processing module is configured to process the target resource transfer entry and mark the target resource transfer entry as an end state after the processing is completed.

In an embodiment, the third response module 520 is configured to send gift prompt information carrying message information sent by the gift client to the recipient client of the recipient user.

Alternatively, the interaction apparatus provided in this embodiment of the present disclosure further includes a sending module. The sending module is configured to, after sending the gift prompt information to the recipient client of the recipient user, send message information sent by the gift client to the recipient client of the recipient user in the form of comment information in the target live-stream room when the recipient user is located in the target live-stream room of the target user.

The preceding interaction apparatus may execute the interaction method provided in the embodiments of the present disclosure and has functional modules and beneficial effects corresponding to the executed method.

FIG. 14 is a diagram illustrating the structure of an interaction apparatus according to an embodiment of the present disclosure. The apparatus is applicable to a case of gifting target objects. The apparatus may be implemented by software and/or hardware and is generally integrated on an electronic device.

As shown in FIG. 14, the apparatus includes a first display module 610 and a fourth response module 620.

The first display module 610 is configured to display gift prompt information. The gift prompt information is sent by a server after the server sends a target object requested to be gifted by a gifting user to a recipient user. The gifting user includes a target user. The target object is configured to establish, for the recipient user, a preset association relationship between the recipient user and the target user.

The fourth response module 620 is configured to display introduction information of the preset association relationship in response to a trigger operation for the gift prompt information.

According to the interaction apparatus provided in this embodiment of the present disclosure, the first display module 610 displays the gift prompt information, where the gift prompt information is sent by the server after the server sends the target object requested to be gifted by the gifting user to the recipient user, the gifting user includes the target user, and the target object is configured to establish the preset association relationship with the target user for the recipient user; and the fourth response module 620 displays the introduction information of the preset association relationship in response to the trigger operation for the gift prompt information. According to the apparatus, the target object which is sent by the server and configured to establish, for the recipient user, the preset association relationship between the recipient user and the target user is received, which implements the complete gifting and receiving of the target object when the target user serves as the gifting user, thereby enriching the subscription mode of the target user and improving interactivity.

In an embodiment, the gift prompt information carries message information of the gifting user.

In an embodiment, the gift prompt information does not carry message information of the gifting user, and the fourth response module 620 is configured to display the introduction information of the preset association relationship in the target live-stream page of the target user, and display message information of the gifting user in the form of comment information in the target live-stream page, where the message information is sent by the server.

In an embodiment, the interaction apparatus provided in this embodiment of the present disclosure further includes a fourth display module and a tenth response module.

The fourth display module is configured to display preset reply information for the message information in a preset input box of the target live-stream page.

The tenth response module is configured to, in response to a reply information sending operation, send the preset reply information in the form of comment information in the target live-stream page.

The preceding interaction apparatus may execute the interaction method provided in the embodiments of the present disclosure and has functional modules and beneficial effects corresponding to the executed method.

Referring to FIG. 15, FIG. 15 is a diagram illustrating the structure of an electronic device 400 suitable for implementing the embodiments of the present disclosure. A terminal device in the embodiments of the present disclosure may include, but is not limited to, mobile terminals such as a mobile phone, a laptop, a digital broadcast receiver, a personal digital assistant (PDA), a PAD, a portable media player (PMP), and an in-vehicle terminal (such as an in-vehicle navigation terminal) and stationary terminals such as a digital television (TV) and a desktop computer. The electronic device shown in FIG. 15 is merely an example and is not intended to limit the function and usage scope of the embodiments of the present disclosure.

As shown in FIG. 15, the electronic device 400 may include a processor 401 (such as a central processing unit and a graphics processing unit). The processor 401 may perform various types of appropriate operations and processing based on a program stored in a read-only memory (ROM) 402 or a program loaded from a storage apparatus 408 to a random-access memory (RAM) 403. Various programs and data required for the operation of the electronic device 400 are also stored in the RAM 403. The processor 401, the ROM 402, and the RAM 403 are connected to each other through a bus 404. An input/output (I/O) interface 405 is also connected to the bus 404.

Generally, the following apparatus may be connected to the I/O interface 405: an input apparatus 406 such as a touch screen, a touch pad, a keyboard, a mouse, a camera, a microphone, an accelerometer, and a gyroscope; an output apparatus 407 such as a liquid crystal display (LCD), a speaker, and a vibrator; the storage apparatus 408 such as a magnetic tape and a hard disk, and a communication apparatus 409. The communication apparatus 409 may allow the electronic device 400 to perform wireless or wired communication with other devices to exchange data. Although FIG. 15 shows the electronic device 400 having various apparatuses, it is to be understood that not all of the apparatuses shown herein need to be implemented or present. Alternatively, more or fewer apparatuses may be implemented or present.

Particularly, according to the embodiments of the present disclosure, the process described above with reference to the flowchart may be implemented as a computer software program. For example, an embodiment of the present disclosure includes a computer program product. The computer program product includes a computer program carried in a non-transitory computer-readable medium. The computer program includes program codes for executing the method shown in the flowchart. In such an embodiment, the computer program may be downloaded from a network and installed through the communication apparatus 409, or may be installed from the storage apparatus 408, or may be installed from the ROM 402. When the computer program is executed by the processor 401, the preceding functions limited in the method in the embodiments of the present disclosure are executed.

It is to be noted that the preceding computer-readable medium in the present disclosure may be a computer-readable signal medium or a computer-readable storage medium or any combination thereof. The computer-readable storage medium, for example, may be, but is not limited to, an electronic, magnetic, optical, electromagnetic, infrared, or semiconductor system, apparatus or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable signal medium may send, propagate, or transmit a program used by or in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future developed network protocol, such as HTTP (HyperText Transfer Protocol), and may be interconnected with any form or medium of digital data communication (such as a communication network). Examples of the communication network include a local area network (LAN), a wide area network (WAN), an internet (such as the Internet), and a peer-to-peer network (such as an Ad-Hoc network), as well as any currently known or future developed network.

The computer-readable medium may be included in the electronic device or may exist alone without being assembled into the electronic device.

The preceding computer-readable medium carries one or more programs. When executed by the electronic device, the one or more programs cause the electronic device to display a gift panel in response to a gift panel display operation for a target object, where the gift panel is configured for a gifting user to select a recipient user corresponding to the target object, the gifting user includes a target user, and the target object is configured to establish, for the recipient user, a first association relationship between the recipient user and the target user; and send a target gift request to a server in response to a gift operation acting in the gift panel, where the target gift request is used for requesting the server to send the target object to the recipient user.

Alternatively, the preceding computer-readable medium carries one or more programs. When executed by the electronic device, the one or more programs cause the electronic device to receive a target gift request of a target object, where the target gift request is sent by a gift client, a gifting user corresponding to the gift client includes a target user, and the target object is configured to establish, for a recipient user for which the target gift request requests gifting, a preset association relationship between the recipient user and the target user; and in response to the target gift request, send the target object to the recipient user, and send gift prompt information to the recipient client of the recipient user.

Alternatively, the preceding computer-readable medium carries one or more programs. When executed by the electronic device, the one or more programs cause the electronic device to display gift prompt information, wherein the gift prompt information is sent by a server after the server sends a target object requested to be gifted by a gifting user to a recipient user, the gifting user includes a target user, and the target object is configured to establish, for the recipient user, a preset association relationship between the recipient user and the target user; and display introduction information of the preset association relationship in response to a trigger operation for the gift prompt information.

Computer program codes for performing the operations in the present disclosure may be written in one or more programming languages or combination thereof. The preceding one or more programming languages include, but are not limited to, object-oriented programming languages such as Java, Smalltalk, and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case relate to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show the possible architecture, function, and operation of the system, method, and computer program product according to various embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The units involved in the embodiments of the present disclosure may be implemented by software or hardware. The name of a module is not intended to limit the unit in a certain circumstance.

The functions described above herein may be executed, at least partially, by one or more hardware logic components. For example, and without limitations, example types of hardware logic components that may be used include a field-programmable gate array (FPGA), an application-specific integrated circuit (ASIC), an application-specific standard product (ASSP), system on a chip (SOC), a complex programmable logic device (CPLD), and the like.

In the context of the present disclosure, the machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

According to one or more embodiments of the present disclosure, example 1 provides an interactive method. The interactive method includes the steps below.

A gift panel is displayed in response to a gift panel display operation for a target object. The gift panel is configured for a gifting user to select a recipient user corresponding to the target object. The gifting user includes a target user. The target object is configured to establish, for the recipient user, a first association relationship between the recipient user and the target user.

A target gift request is sent to a server in response to a gift operation acting in the gift panel. The target gift request is used for requesting the server to send the target object to the recipient user.

According to one or more embodiments of the present disclosure, example 2 is provided according to the method described in example 1.

In example 2, permission prompt information for the target object is displayed in a preset page, where the preset page includes a live-stream page of the target user and/or a message list page of the target user; and the permission prompt information is sent by the server after the server grants a gift permission of the target object to the gifting user, where the permission prompt information is used for prompting the gifting user to have the gift permission of the target object.

The step in which the gift panel is displayed in response to the gift panel display operation for the target object includes that the gift panel is displayed in response to a trigger operation for the permission prompt information.

According to one or more embodiments of the present disclosure, example 3 is provided according to the method described in example 1. In example 3. the recipient user includes a user corresponding to a user identifier in a selected state in the gift panel, and the step in which the gift panel is displayed includes that the gift panel is displayed, and each user identifier in the gift panel is displayed to be in an unselected state; or, the gift panel is displayed, and at least one user identifier in the gift panel is displayed to be in a selected state.

According to one or more embodiments of the present disclosure, example 4 is provided according to the method described in example 1. In example 4, the gift panel includes a first identifier area and a second identifier area, the first identifier area is configured to display a user identifier of at least one association user of the gifting user, and the association user has a second association relationship with the gifting user; and the second identifier area is configured to display a user identifier of at least one recommended user in a target live-stream room, and the target live-stream room is a live-stream room of the target user.

According to one or more embodiments of the present disclosure, example 5 is provided according to the method described in example 4. In example 5, the recipient user includes a user corresponding to a user identifier in a selected state in a first user list, and the method further includes that the first user list is displayed in response to a first list display operation acting in the gift panel, where the first user list includes an association user list and/or a recommended user list, the association user list is configured to display a user identifier of an association user of the gifting user, and the recommended user list is configured to display a user identifier of a recommended user in the target live-stream room.

According to one or more embodiments of the present disclosure, example 6 is provided according to the method described in example 1. In example 6, the recipient user includes a user corresponding to a user identifier in a selected state in a second user list, and the method further includes that a second user list is displayed in response to a second list display operation acting in the gift panel, where the second user list is configured to display a to-be-selected user identifier; and in response to a selection completion operation acting in the second user list, a user identifier in a selected state in the second user list is added to and displayed in the gift panel.

According to one or more embodiments of the present disclosure, example 7 is provided according to the method described in example 6. In example 7, the gift panel display operation acts in a first panel corresponding to a target object. the target object includes a first target object acquired by the gifting user through resource transfer, and the step in which the target gift request is sent to the server in response to the gift operation acting in the gift panel includes that a second panel is displayed in response to the gift operation acting in the gift panel, where the second panel is configured for the gifting user to perform a resource transfer operation; and a target gift request is sent to the server when the gifting user completes the resource transfer corresponding to the target object.

According to one or more embodiments of the present disclosure, example 8 is provided according to the method described in example 1. In example 8, after the target gift request is sent to the server, the method further includes that a message panel is displayed in response to a message operation of the gifting user, where the message panel is configured for the gifting user to input message information; and in response to a message sending operation acting in the message panel, the message information is sent to the server to forward the message information to a recipient client of the recipient user through the server.

According to one or more embodiments of the present disclosure, example 9 is provided according to the method described in example 8. In example 9, the method further includes that the message information is displayed in the form of comment information in the target live-stream page of the target user when the gifting user is located in the target live-stream room of the target user.

According to one or more embodiments of the present disclosure, example 10 is provided according to the method described in example 1. In example 10, the target object includes a second target object gifted by a target platform to the gifting user and/or a third target object gifted by a target user to the gifting user.

According to one or more embodiments of the present disclosure, example 11 provides an interactive method. The interactive method includes that a target gift request of a target object is received, where the target gift request is sent by a gift client, a gifting user corresponding to the gift client includes a target user, and the target object is configured to establish, for a recipient user for which the target gift request requests gifting, a preset association relationship between the recipient user and the target user; and in response to the target gift request, the target object is sent to the recipient user and gift prompt information is sent to a recipient client of the recipient user.

According to one or more embodiments of the present disclosure, example 12 is provided according to the method described in example 11. In example 12, the step in which the target object is sent to the recipient user includes that the preset association relationship between the recipient user and the target user is established for the recipient user for which the target gift request requests gifting.

According to one or more embodiments of the present disclosure, example 13 is provided according to the method described in example 11. In example 13, before the target gift request of the target object is received, the method further includes that a gift permission of the target object is granted to the gifting user corresponding to the gift client, and permission prompt information is sent to the gift client.

According to one or more embodiments of the present disclosure, example 14 is provided according to the method described in example 13. In example 14, the gift permission includes a permission to gift a preset number of target objects, and after the gift permission of the target object is granted to the gifting user corresponding to the gift client, the method further includes that resource transfer entries corresponding to the preset number of target objects are established.

According to one or more embodiments of the present disclosure, example 15 is provided according to the method described in example 14. In example 15, after the target object is sent to the recipient user, the method further includes that the user identifier of the recipient user is added to entry information of a target resource transfer entry, where the target resource transfer entry is a resource transfer entry corresponding to the target gift request among the resource transfer entries, and the entry information includes the entry identifier of the resource transfer entry, the user identifier of the gifting user, and the user identifier of the target user; and the target resource transfer entry is processed, and the target resource transfer entry is marked as an end state after the processing is completed.

According to one or more embodiments of the present disclosure, example 16 is provided according to the method described in example 11. In example 16, the step in which the gift prompt information is sent to the recipient client of the recipient user includes that gift prompt information carrying message information sent by the gift client is sent to the recipient client of the recipient user; or, after the gift prompt information is sent to the recipient client of the recipient user, the method further includes that, when the recipient user is located in a target live-stream room of the target user, message information sent by the gift client is sent to the recipient client of the recipient user in the form of comment information in the target live-stream room.

According to one or more embodiments of the present disclosure, example 17 provides an interactive method. The interactive method includes that gift prompt information is displayed, where the gift prompt information is sent by a server after the server sends a target object requested to be gifted by a gifting user to a recipient user, the gifting user includes a target user, and the target object is configured to establish, for the recipient user, a preset association relationship between the recipient user and the target user; and introduction information of the preset association relationship is displayed in response to a trigger operation for the gift prompt information.

According to one or more embodiments of the present disclosure, example 18 is provided according to the method described in example 17. In example 18, the gift prompt information carries message information of the gifting user.

According to one or more embodiments of the present disclosure, example 19 is provided according to the method described in example 17. In example 19, the gift prompt information does not carry message information of the gifting user, and the step in which the introduction information of the preset association relationship is displayed includes that the introduction information of the preset association relationship is displayed in the target live-stream page of the target user, and message information of the gifting user is displayed in the form of comment information in the target live-stream page, where the message information is sent by the server.

According to one or more embodiments of the present disclosure, example 20 is provided according to the method described in example 19. In example 20, the method further includes that preset reply information for the message information is displayed in a preset input box of the target live-stream page; and in response to a reply information sending operation, the preset reply information is sent in the form of comment information in the target live-stream page.

According to one or more embodiments of the present disclosure, example 21 provides an interactive apparatus. The interactive apparatus includes a first response module and a second response module.

The first response module is configured to display a gift panel in response to a gift panel display operation for a target object. The gift panel is configured for a gifting user to select a recipient user corresponding to the target object. The gifting user includes a target user. The target object is configured to establish, for the recipient user, a first association relationship between the recipient user and the target user.

The second response module is configured to send a target gift request to a server in response to a gift operation acting in the gift panel. The target gift request is used for requesting the server to send the target object to the recipient user.

According to one or more embodiments of the present disclosure, example 22 provides an interactive apparatus. The interactive apparatus includes a reception module and a third response module.

The reception module is configured to receive a target gift request of a target object. The target gift request is sent by a gift client. A gifting user corresponding to the gift client includes a target user. The target object is configured to establish, for a recipient user for which the target gift request requests gifting, a preset association relationship between the recipient user and the target user.

The third response module is configured to, in response to the target gift request, send the target object to the recipient user and send gift prompt information to a recipient client of the recipient user.

According to one or more embodiments of the present disclosure, example 23 provides an interactive apparatus. The interactive apparatus includes a first display module and a fourth response module.

The first display module is configured to display gift prompt information. The gift prompt information is sent by a server after the server sends a target object requested to be gifted by a gifting user to a recipient user. The gifting user includes a target user. The target object is configured to establish, for the recipient user, a preset association relationship between the recipient user and the target user.

The fourth response module is configured to display introduction information of the preset association relationship in response to a trigger operation for the gift prompt information.

According to one or more embodiments of the present disclosure, example 24 provides an electronic device. The electronic device includes one or more processors and a memory.

The memory is configured to store one or more programs.

The one or more programs, when executed by the one or more processors, cause the one or more processors to implement the interaction method of any one of example 1 to example 20.

According to one or more embodiments of the present disclosure, example 25 provides a computer-readable medium storing a computer program. The computer program, when executed by a processor, implements the interaction method of any one of example 1 to example 20.

According to one or more embodiments of the present disclosure, example 26 provides a computer program product. The computer program product, when executed by a computer, causes the computer to implement the interaction method of any one of example 1 to example 20.

The preceding description is merely illustrative of preferred embodiments of the present disclosure and the technical principles used therein. Those skilled in the art should understand that the scope referred to in the disclosure is not limited to the technical solutions formed by the particular combination of the preceding technical features, but intended to cover other technical solutions which may be formed by any combination of the preceding technical features or their equivalents without departing from the concept of the disclosure, for example, technical solutions formed by mutual substitutions of the preceding feature and the technical features disclosed in the present disclosure (but not limited to) that have similar functions.

In addition, although the operations are depicted in a particular order, this should not be construed as requiring that such operations should be performed in the particular order shown or in a sequential order. In certain circumstances, multitasking and parallel processing may be advantageous. Similarly, although specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually, or in any suitable sub-combination.

Although the subject matter is described in the language specific to structural features and/or methodological logic acts, it is to be understood that the subject matter defined in the appended claims is not necessarily limited to the specific features or acts described above. Conversely, the specific features and acts described above are merely example forms of implementing the claims.

The invention claimed is:

1. An interaction method, comprising:
in response to a gift panel display operation for a target object, displaying a gift panel, wherein the gift panel is configured for a gifting user to select a recipient user corresponding to the target object, the gifting user comprises a target user, and the target object is configured to establish, for the recipient user, a first association relationship between the recipient user and the target user; and
in response to a gift operation acting in the gift panel, sending a target gift request to a server, wherein the target gift request is used for requesting the server to send the target object to the recipient user;
wherein the gift panel comprises a first identifier area and a second identifier area, wherein the first identifier area is configured to display a user identifier of at least one association user of the gifting user, and the at least one association user has a second association relationship with the gifting user; and the second identifier area is configured to display a user identifier of at least one recommended user in a target live-stream room, and the target live-stream room is a live-stream room of the target user.

2. The method of claim 1, further comprising:
displaying, in a preset page, permission prompt information for the target object, wherein the preset page comprises at least one of a live-stream page of the target user or a message list page of the target user; and the permission prompt information is sent by the server after the server grants a gift permission of the target object to the gifting user, and the permission prompt information is used for prompting the gifting user to have the gift permission of the target object; and
wherein in response to the gift panel display operation for the target object, displaying the gift panel comprises:
in response to a trigger operation for the permission prompt information, displaying the gift panel.

3. The method of claim 1, wherein the recipient user comprises a user corresponding to a user identifier in a selected state in the gift panel, and wherein displaying the gift panel comprises:
displaying the gift panel, and displaying each user identifier, which is in the gift panel, to be in an unselected state; or
displaying the gift panel, and displaying at least one user identifier, which is in the gift panel, to be in the selected state.

4. The method of claim 1, wherein the recipient user comprises a user corresponding to a user identifier in a selected state in a first user list, and the method further comprises:
in response to a first list display operation acting in the gift panel, displaying the first user list, wherein the first user list comprises at least one of an association user list or a recommended user list, the association user list is configured to display a user identifier of an association user of the gifting user, and the recommended user list is configured to display a user identifier of a recommended user in the target live-stream room.

5. The method of claim 1, wherein the recipient user comprises a user corresponding to a user identifier in a selected state in a second user list, and the method further comprises:
in response to a second list display operation acting in the gift panel, displaying the second user list, wherein the second user list is configured to display a to-be-selected user identifier; and
in response to a selection completion operation acting in the second user list, adding a user identifier in the selected state in the second user list to the gift panel, and displaying the added user identifier in the gift panel.

6. The method of claim 5, wherein the gift panel display operation acts in a first panel corresponding to the target object, and the target object comprises a first target object acquired by the gifting user through resource transfer; and wherein in response to the gift operation acting in the gift panel, sending the target gift request to the server comprises:
in response to the gift operation acting in the gift panel, displaying a second panel, wherein the second panel is configured for the gifting user to perform a resource transfer operation; and
sending the target gift request to the server when the gifting user completes resource transfer corresponding to the target object.

7. The method of claim 1, after sending the target gift request to the server, further comprising:
in response to a message operation of the gifting user, displaying a message panel, wherein the message panel is configured for the gifting user to input message information; and
in response to a message sending operation acting in the message panel, sending the message information to the server to forward the message information to a recipient client of the recipient user through the server.

8. The method of claim 7, further comprising:

when the recipient user is located in the target live-stream room of the target user, displaying, in a target live-stream page of the target user, the message information in a form of comment information.

9. The method of claim 1, wherein the target object comprises at least one of a second target object gifted by a target platform to the gifting user or a third target object gifted by another target user to the gifting user.

10. An electronic device, comprising:

at least one processor; and a memory communicatively connected to the at least one processor, wherein the memory stores a computer program executable by the at least one processor, and the computer program, when executed by the at least one processor, causes the at least one processor to execute the interaction method of claim 1.

\* \* \* \* \*